(12) United States Patent
Dai et al.

(10) Patent No.: US 7,623,712 B2
(45) Date of Patent: Nov. 24, 2009

(54) IMAGE PROCESSING METHOD AND APPARATUS

(75) Inventors: Xiaoyan Dai, Yokohama (JP); Hidefumi Osawa, Saitama (JP)

(73) Assignee: Canon Kabushiki Kaisha, Tokyo (JP)

( * ) Notice: Subject to any disclaimer, the term of this patent is extended or adjusted under 35 U.S.C. 154(b) by 672 days.

(21) Appl. No.: 11/444,389

(22) Filed: Jun. 1, 2006

(65) Prior Publication Data

US 2007/0025617 A1 Feb. 1, 2007

(30) Foreign Application Priority Data

Jun. 9, 2005 (JP) .............................. 2005-170043
Dec. 5, 2005 (JP) .............................. 2005-351312
Mar. 30, 2006 (JP) .............................. 2006-095841

(51) Int. Cl.
*G06K 9/34* (2006.01)
*G06K 9/62* (2006.01)

(52) U.S. Cl. ........................ 382/180; 382/225; 382/277

(58) Field of Classification Search ................ 382/162, 382/164, 167, 168, 172, 173, 180, 181, 190, 382/218–220, 224–225, 276, 277, 284; 358/515, 358/518, 520, 523, 525, 530; 345/428, 505, 345/589–591, 600–604, 620
See application file for complete search history.

(56) References Cited

U.S. PATENT DOCUMENTS

| | | | | |
|---|---|---|---|---|
| 5,680,478 A | 10/1997 | Wang et al. | ................. | 382/176 |
| 6,791,564 B1 * | 9/2004 | Elliott et al. | ................. | 345/589 |
| 6,791,567 B1 * | 9/2004 | Segal | ........................... | 345/590 |
| 7,327,504 B2 * | 2/2008 | Gallagher | .................... | 358/518 |
| 2001/0014897 A1 | 8/2001 | Hata et al. | .................. | 707/506 |
| 2003/0179200 A1 * | 9/2003 | Martin et al. | ............... | 345/428 |
| 2004/0001066 A1 * | 1/2004 | Bik et al. | ..................... | 345/505 |
| 2004/0223197 A1 | 11/2004 | Ohta et al. | ................... | 358/538 |
| 2006/0045386 A1 | 3/2006 | Fukuoka et al. | ............. | 382/305 |
| 2007/0025617 A1 * | 2/2007 | Dai et al. | ..................... | 382/180 |
| 2007/0086667 A1 | 4/2007 | Dai et al. | .................... | 382/242 |

FOREIGN PATENT DOCUMENTS

| | | |
|---|---|---|
| JP | 5-114045 | 5/1993 |
| JP | 2885999 | 2/1994 |
| JP | 9-186866 | 7/1997 |
| JP | 2001-236517 | 8/2001 |
| JP | 2002-314806 | 10/2002 |
| JP | 2004-246554 | 9/2004 |
| JP | 2004-265384 | 9/2004 |

\* cited by examiner

*Primary Examiner*—Amir Alavi
(74) *Attorney, Agent, or Firm*—Fitzpatrick, Cella, Harper & Scinto

(57) ABSTRACT

Disclosed is an image processing apparatus in which vector data from which noise has been removed and amount of data reduced can be generated in ideal fashion with regard to an illustration area selected from a document image. The document image is input to the apparatus and is segmented into a plurality of areas. A clip-art image is selected from these areas and a plurality of clusters are generated with regard to this image area. When a small area included in the plurality of clusters is determined as a noise, the noise is eliminated by combining the small area with a adjacent cluster. After noise is removed, the cluster group eventually obtained is converted to vector data.

20 Claims, 29 Drawing Sheets

FIG. 8
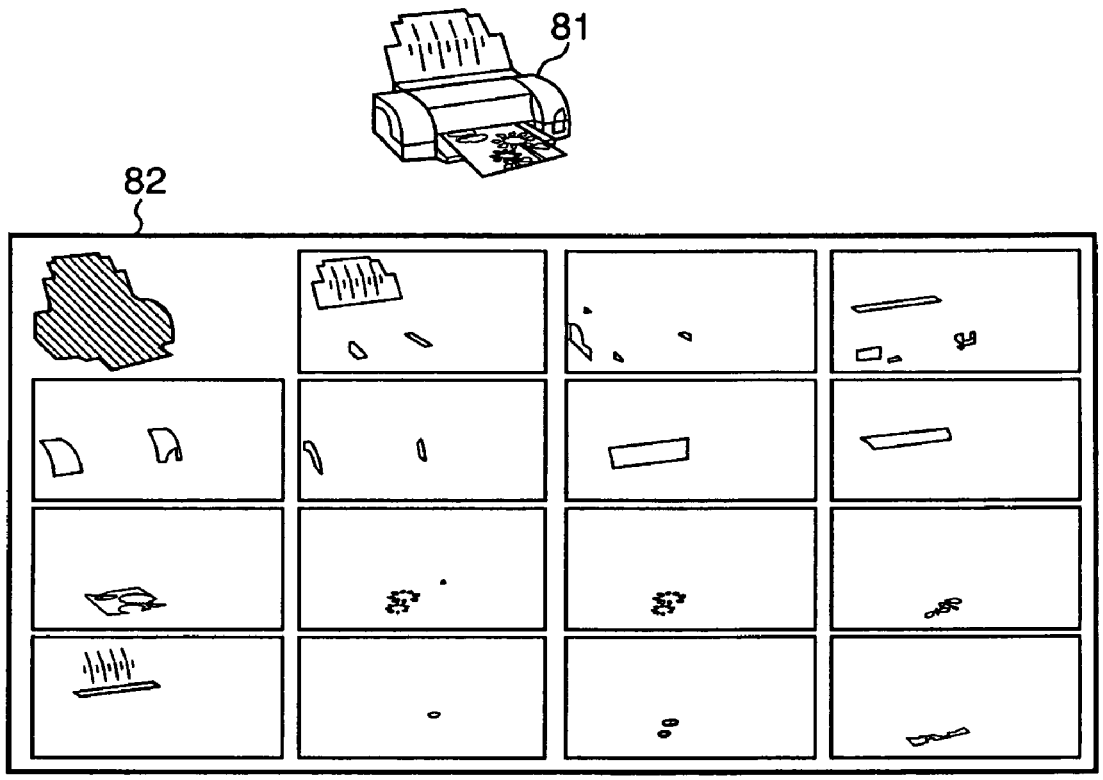
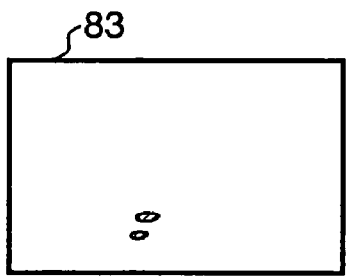
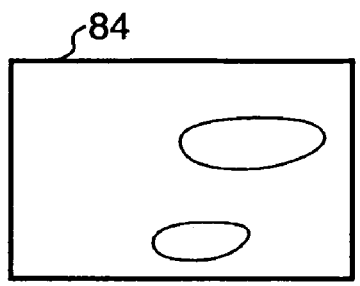
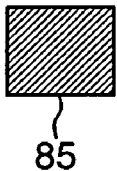
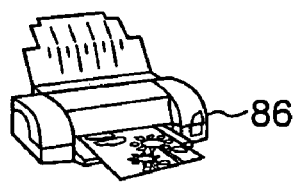

FIG. 24
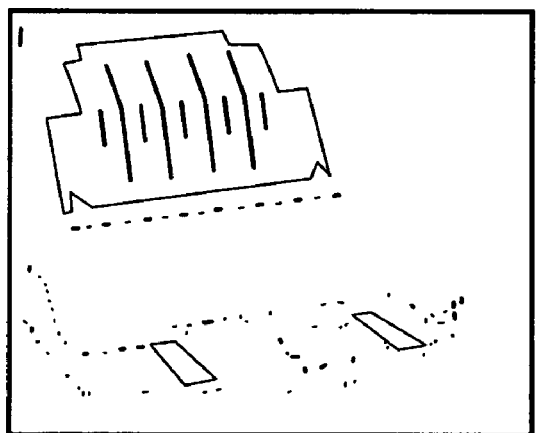
61
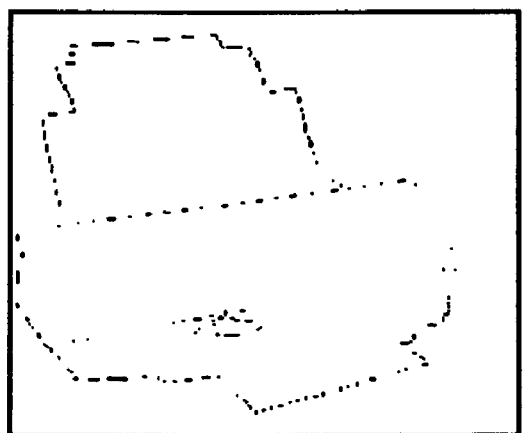
62

F I G. 26
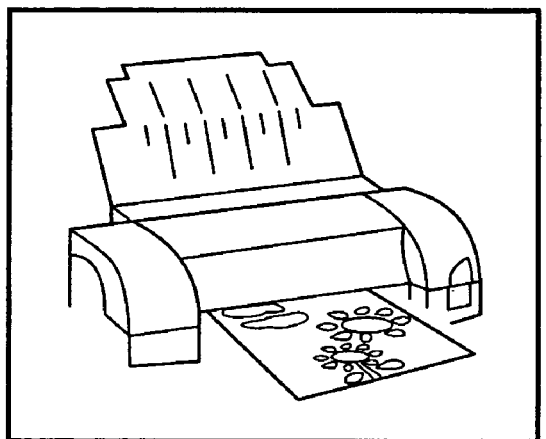
1711
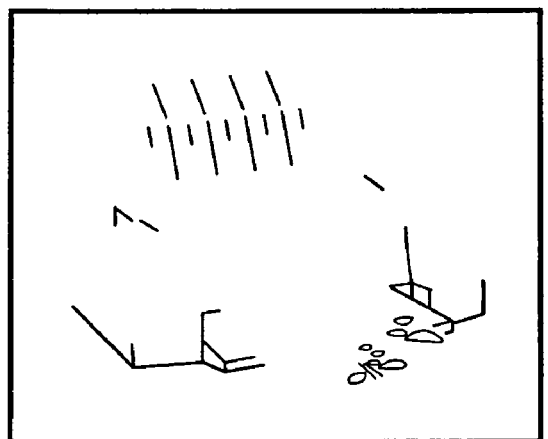
1712
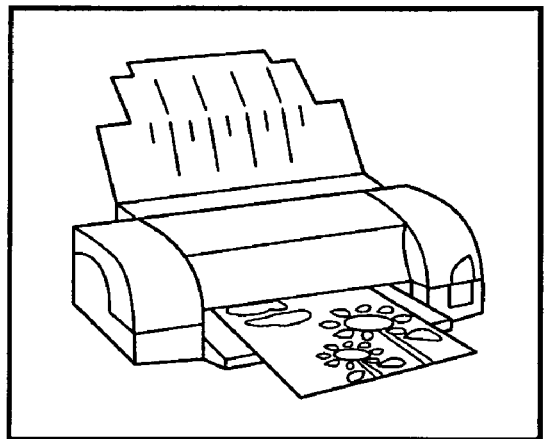
1713

IMAGE PROCESSING METHOD AND APPARATUS

FIELD OF THE INVENTION

This invention relates to an image processing method and apparatus for segmenting an image, which has been obtained by scanning a paper document, into areas and vectorizing the image on a per-area basis.

BACKGROUND OF THE INVENTION

The electronification of information has continued to proceed in recent years and there is growing use of systems in which paper documents, rather than being archived as is, are put into electronic form and stored, and in which the resulting electronic data may be transmitted to other systems or devices. Further, documents that can undergo such conversion to electronic form are no longer limited solely to black-and-white bi-level images and it is now becoming possible to obtain electronic documents of full-color (multilevel) images.

Furthermore, electronic documents are no longer merely those obtained by simply scanning a document on paper using a scanner or the like to convert the document to image data. Electronic documents now contain document images produced by conversion of the original to more sophisticated information. For example, a document image is separated into areas, character recognition processing is applied to the text areas to convert them to strings of character code, and photographic areas are converted to vector data representing contours. (For example, see the specification of Japanese Patent Application Laid-Open No. 2004-265384.)

Such vectorized images, even though they may be full-color images, also include images obtained by scanning and vectorizing documents created by software for producing illustrations and graphics. These images have object contours that are more clearly defined in comparison with natural images such as photographs and are characterized in that the colors which appear are more limited. These images shall be referred to as "clip-art images".

According to a method of generating road data disclosed in the specification of Japanese Patent Application Laid-Open No. 2004-246554, first a photographic image that has been input in full color is converted to a bi-level image. Next, contours and center lines are extracted from the bi-level image and the lines obtained and the color information of the original image are converted to vector data. It is described that processing for dealing with noise eliminates isolated noise by execution of expansion and contraction processing.

Image vectorization processing is executed as follows according to the prior art: First, an image that has been input in full color is converted to a bi-level image, contours and center lines are then extracted from the bi-level image and the lines obtained and the color information of the original image are converted to vector data.

Processing for separating a document image into areas such as text and photographic areas is a focus of interest in the prior art. Many of such proposed methods segment an image into small areas and distinguish between text and photographs based upon the features of each of the small areas. Further, in applications to document images, often compression processing or correction processing is executed on a per-area basis after processing for separation into text and photographic areas, etc. (For example, see the specifications of Japanese Patent Application Laid-Open Nos. 5-114045 and 9-186866).

Further, a method of determining whether an area is one that should be segmented or not is known for the purpose of efficiently transmitting and storing, without loss, information that results after the separation of a document image into areas (e.g., see the specification of Japanese Patent Application Laid-Open No. 2001-236517). The method described in this prior-art specification includes executing tone-reduction processing (histogram segmentation) and determining whether the difference before and after processing is smaller than a newly decided value.

With the conventional processing described above, however, there are occasions where a valuable area is mistakenly erased as a noise area. In such cases an accurate edge cannot be obtained and the image after vectorization exhibits a decline in image quality. If noise removal is not carried out, a noise area is left as is and a contour is vectorized, then a problem which arises is a tremendous increase in the amount of vector data.

On the other hand, with regard to a clip-art image of the kind mentioned above, it is considered effective to execute vectorization processing, which is based upon an area segmentation method, in accordance with the features of the clip-art image.

In examples of the prior art, however, one does not come across vectorization processing that follows the automatic discrimination of image type (e.g., whether the image is one having an edge or exhibiting gradation). When the same processing is applied to images of different types, suitable vectorized results are not obtained and some processing is executed needlessly.

Graphics include simple clip-art images and texture patterns such as natural images and may include complicated images having a large number of colors. Here a clip-art image is meant to refer to an image of a limited number of colors, such as an illustration (namely an image of a small number of colors). Further, vectorization processing based upon area segmentation that is capable of compressing image information efficiently without loss is suited to clip art. However, this processing is not suited to images of the kind in which portions that are not graphics have been erroneously discriminated as graphics owing to the accuracy of area separation, and to images which, despite being discriminated as graphics, are natural images. It is difficult to obtain compressed images having good image quality when such images are subjected to this processing.

Further, the method described in the specification of Japanese Patent Application Laid-Open No. 2001-236517 does not take into consideration the features of clip art in graphic areas and therefore this method cannot be applied to determinations as to whether a graphics area is a clip-art image or not.

SUMMARY OF THE INVENTION

Accordingly, an object of the present invention is to solve the problems of the prior art set forth above.

In accordance with the present invention, vector data from which noise has been removed and amount of data reduced can be generated in ideal fashion with regard to a graphics area selected from a document image. Ideal vector data can be generated particularly with regard to a clip-art image area such as an illustration. Further, whether or not a clip-art image has a feature such as an edge or gradation can be discriminated and suitable vectorization processing that conforms to the type of image can be executed. Furthermore, a clip-art image area can be discriminated at high speed and vectorization processing is applied only to this image area, thereby making it possible to prevent a decline in image quality when compression is applied.

Further, according to the present invention, the foregoing object is attained by providing an image processing method comprising: a segmentation step of segmenting a document image into a plurality of areas; a selection step of selecting an illustration area from among the plurality of areas; a clustering step of clustering the illustration area selected, and generating a plurality of clusters; a determination step of determining whether a small area included in the generated clusters is noise; an elimination step of eliminating a small area determined as being noise by combining the noise small area with a cluster determined as being similar among clusters adjacent to the small area; and a conversion step of converting the cluster from which the noise small areas have been eliminated in the elimination step into vector data.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIG. 8 is a diagram illustrating an example of vectorization that is based upon area segmentation of a clip-art image according to an embodiment of the present invention;

FIG. 24 is a diagram illustrating an example of noise dealt with by image processing according to the sixth embodiment;

FIG. 26 is a diagram illustrating an example in which an initially formed edge cluster and a cluster that has been discriminated to be an edge cluster in clusters obtained by segmentation are unified in accordance with the sixth embodiment;

DETAILED DESCRIPTION OF THE PREFERRED EMBODIMENTS

Preferred embodiments of the present invention will now be described in detail with reference to the drawings. It should be noted that the relative arrangement of the components, the numerical expressions and numerical values set forth in these embodiments do not limit the scope of the present invention unless it is specifically stated otherwise.

First Embodiment

[Structure]

Figure 1:
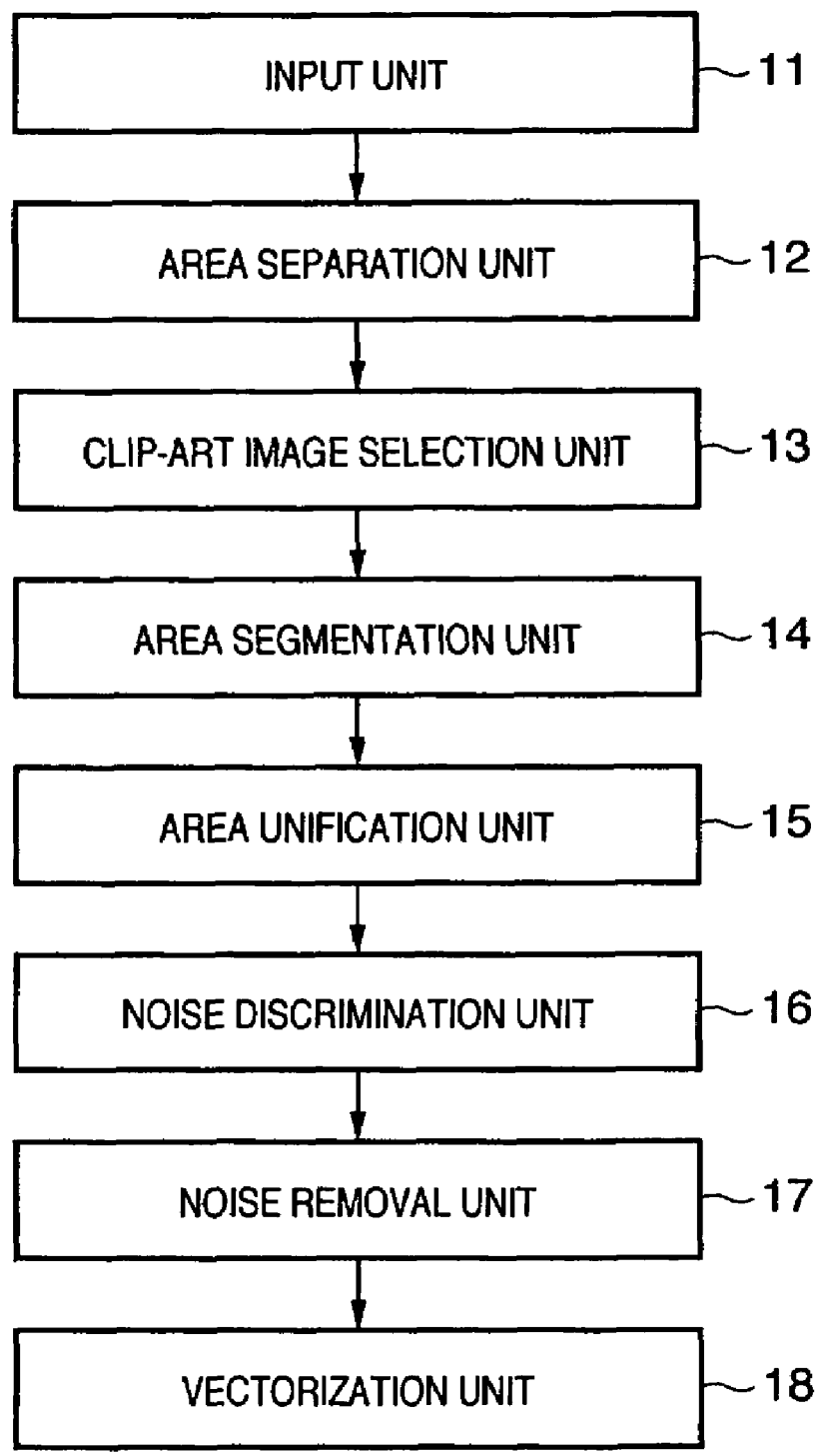
FIG. 1 is a block diagram illustrating the structure of an image processing apparatus having a function for executing vectorization processing based upon area segmentation in a first embodiment of the present invention.

FIG. 1 is a block diagram illustrating the structure of an image processing apparatus having a function for executing vectorization processing based upon area segmentation in a first embodiment of the present invention. In FIG. 1, an input unit 11 inputs a color document image by scanning in a paper document or the like. An area separation unit 12 separates the color document image, which has been input by the input unit 11, into areas of a plurality of types that include a photographic area. A clip-art image selection unit 13 selects a clip-art image from the areas separated from the input image by the processing executed using the area separation unit 12.

An area segmentation unit 14 segments the clip-art image, which has been selected by the clip-art image selection unit 13, into a plurality of areas based upon the color features of the clip-art image. An area unification unit 15 unifies similar areas among the plurality of areas obtained by segmentation. A noise discrimination unit 16 discriminates a noise area from each area obtained by segmentation and unification. A noise removal unit 17 removes an area discriminated as being noise by the noise discrimination unit 16. A vectorization unit 18 converts each area that is the result of area segmentation (the area after unification if unification has been performed and the area after noise removal if noise has been removed) to vector data.

Figure 10:
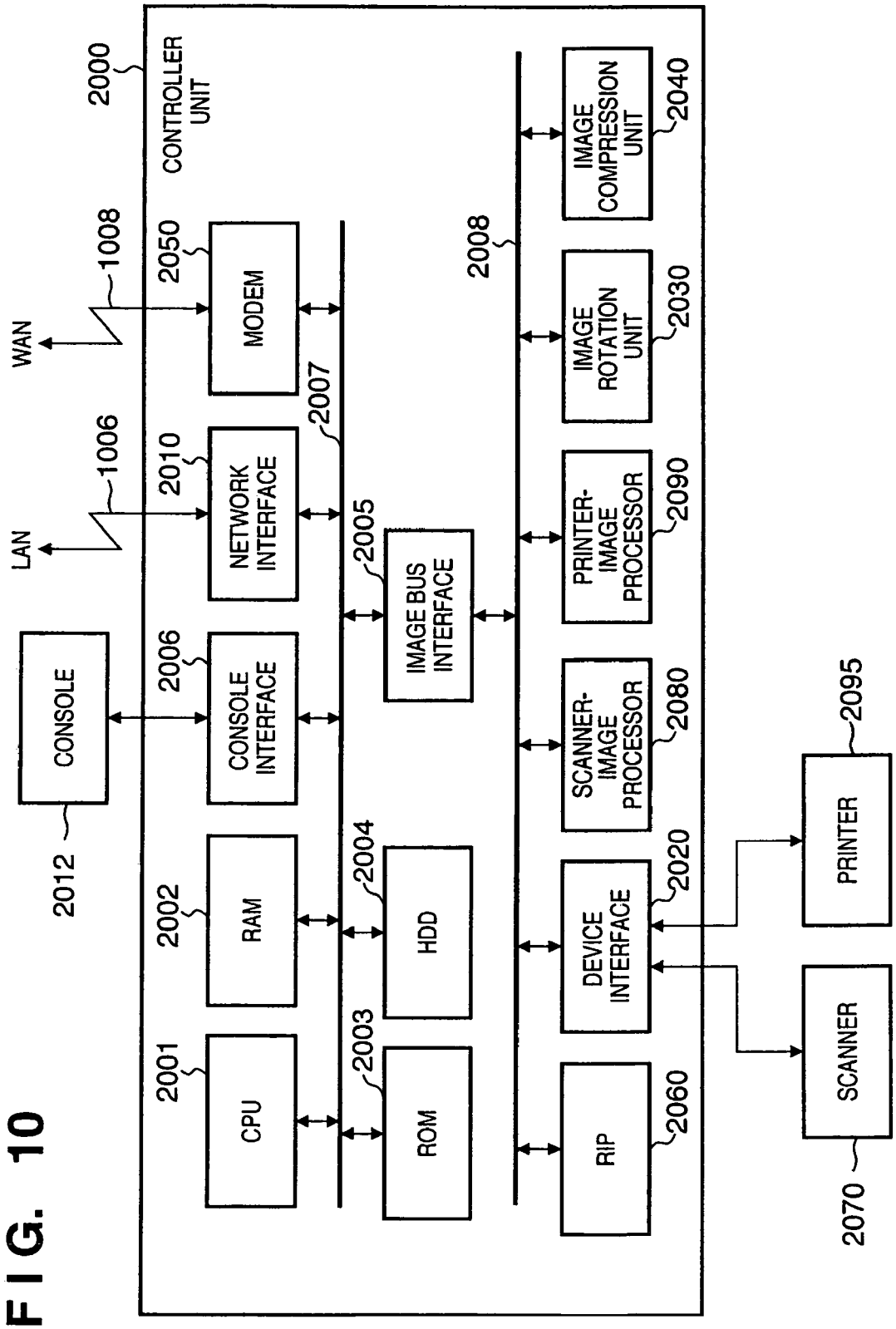
FIG. 10 is a block diagram illustrating the main components of a digital multifunction peripheral (MFP) serving as an embodiment for implementing the image processing apparatus shown in FIG. 1.

FIG. 10 is a block diagram illustrating the main components of a digital multifunction peripheral (MFP) serving as an embodiment for implementing the image processing apparatus shown in FIG. 1. Although an MFP having a scanner function and printer function is used as an image processing apparatus in this embodiment, a system to which a general-purpose scanner and personal computer have been connected may be used as the image processing apparatus.

As shown in FIG. 10, the MFP has a controller unit 2000 that functions as an image processing apparatus. A scanner 2070 serving as an image input device and a printer 2095 serving as an image output device are connected to the controller unit 2000, which exercises control in order to implement a copy function for using the printer 2095 to print out image data that has been read from a document image by the scanner 2070. Further, the controller unit 2000 exercises control in order to input and output pattern images and device information, etc., to and from other devices via a LAN 1006 or public line (WAN) 1008.

As illustrated in FIG. 10, the controller unit 2000 has a CPU 2001. The latter starts up an operating system by a booting program that has been stored in a ROM 2003. The CPU 2001 executes various processing by running application programs that have been stored in a hard-disk drive (HDD) 2004 under the operating system. A RAM 2002 is used as a work area of the CPU 2001. The RAM 2002 not only serves as a work area of the CPU 2001 but also provides an image memory area for storing image data temporarily. The hard-disk drive 2004 stores image data in addition to the above-mentioned application programs.

Besides the ROM 2003 and RAM 2002, a console interface 2006, a network interface 2010, a modem 2050 and an image bus interface 2005 are connected to the CPU 2001 via a system bus 2007.

The console interface 2006 interfaces a console 2012 having a touch-sensitive panel and outputs image data, which is displayed on the console 2012, to the console 2012. The console interface 2006 further sends the CPU 2001 information that has been input by the user at the console 2012.

Further, the network interface 2010 is connected to the LAN 1006 and inputs and outputs information to and from devices, which are connected to the LAN 1006, via the LAN. The modem 2050 is connected to the public line 1008 and inputs and outputs information to and from other devices via the public line 1008.

The image bus interface 2005, which is a bus bridge for converting data structure, is connected to the system bus 2007 and to an image bus 2008 that transfers image data at high speed. The image bus 2008 comprises a PCI bus or an IEEE 1394. Provided on the image bus 2008 are a raster-image processor (RIP) 2060, a device interface 2020, a scanner-image processor 2080, a printer-image processor 2090, an image rotation unit 2030, a thumbnail creation unit 2035 and an image compression unit 2040.

The RIP 2060 is a processor for expanding PDL code into a bitmap image. The scanner 2070 and printer 2095 are connected to the device interface 2020 and convert image data on synchronous and asynchronous channels. The scanner-image processor 2080 subjects input image data to correction, manipulation and editing processing. The printer-image processor 2090 subjects printout image data to a printer correction and resolution conversion, etc. The image rotation unit 2030 rotates image data. The image compression unit 2040 compresses multilevel image data to JPEG data, compresses bi-level image data to JBIG, MMR, MH and other data, and executes processing for decompressing such data.

[Overview of Vectorization Processing Based Upon Area Segmentation]

Figure 2:
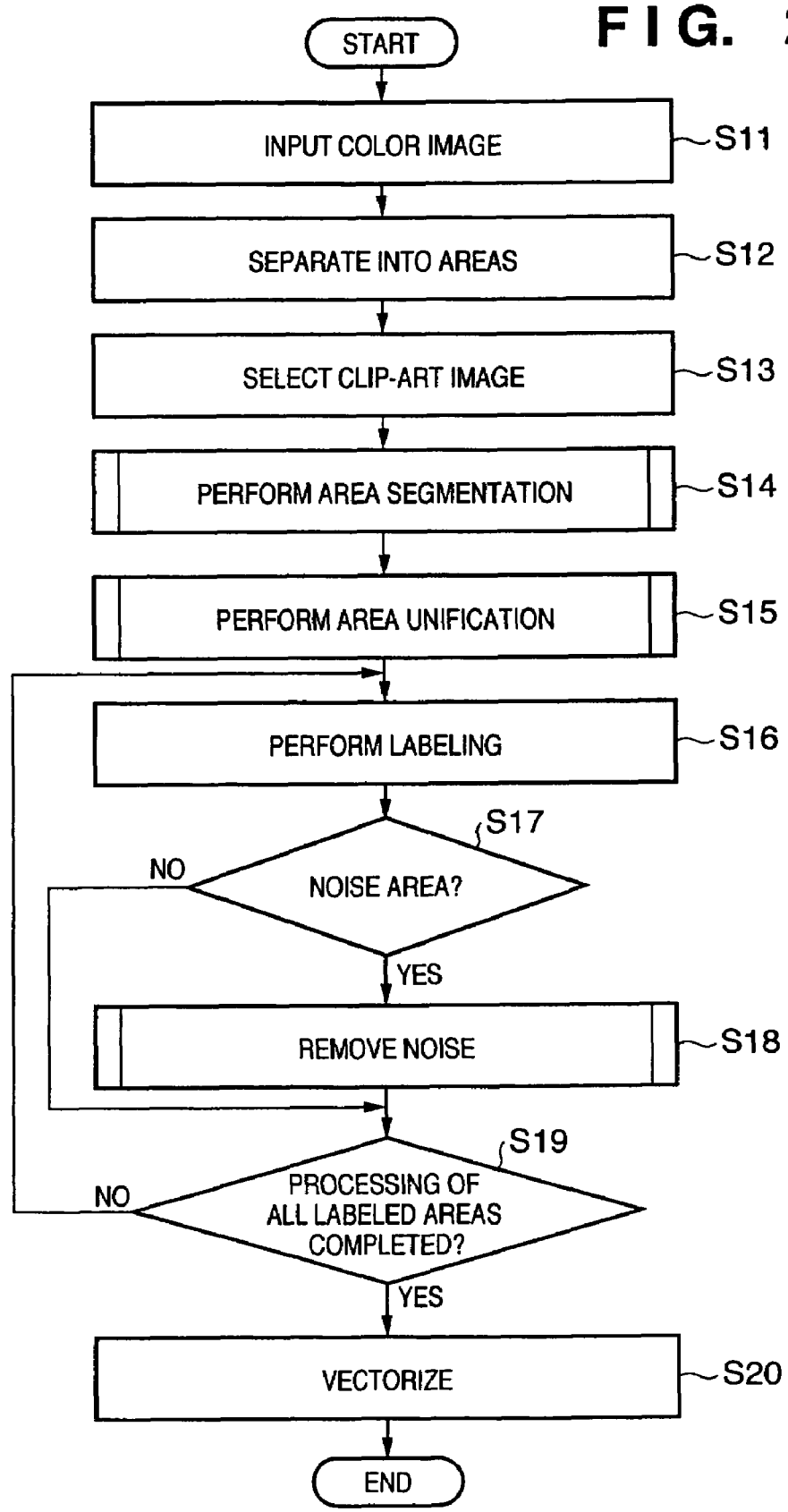
FIG. 2 is a flowchart useful in describing the details of vectorization processing that is based upon area segmentation of a clip-art image in the first embodiment.

FIG. 2 is a flowchart useful in describing the details of vectorization processing that is based upon area segmentation of a clip-art image in the first embodiment.

First, color document image data is obtained with this image processing apparatus as by scanning in a paper document using the input unit 11 (step S11). Next, the area separation unit 12 applies binarization processing to the color document image that has been input at step S11, thereby converting the image to bi-level image data, and separates the bi-level image data into areas of a plurality of types, such as text, photograph and table areas (step S12). It should be noted that a technique described in the specification of U.S. Pat. No. 5,680,478 entitled "Method and Apparatus for Character Recognition". (Shin-Ywan Wang et al./.Canon K. K.) can be used as one example of means for implementing this area separation processing. The area separation processing in this embodiment also can utilize this technique.

Next, the clip-art image selection unit 13 selects clip-art images from the areas obtained by separation at the area separation step of step S12 (step S13). Next, the area segmentation unit 14 executes clustering processing based upon the color features of each of the selected clip-art images and segments each clip-art image into clusters (i.e., performs area segmentation) (step S14). The details of area segmentation processing will be described later.

The area unification unit 15 performs area unification by unifying the clusters, which have been obtained by segmentation at step S14, depending upon degree of similarity (step S15). The details of this area unification processing will be described later.

The noise discrimination unit 16 thenceforth labels pixels included in each of the clusters with the results of area segmentation. This labeling makes it possible to discriminate plural of small areas (labeled areas) consisting of a lump of pixels. Tracing the contour of each cluster makes the discrimination possible as well. Then the noise discrimination unit 16 counts the number of pixels in each of the small areas (size of each of the small areas) (step S16). The noise discrimination unit 16 then compares the number of pixels in the small area with a certain threshold value, thereby determining whether or not the small area is a noise area (step S17). The labeled area (the small area) smaller than the threshold value is judged to be a noise area ("YES" at step S17). On the other hand, a labeled area equal to or greater than the threshold value is judged not to be a noise area ("NO" at step S17) and control proceeds to step S19. The details of noise discrimination processing will be described later.

Next, the noise removal unit 17 subjects noise pixels contained in the noise area discriminated at step S17 to clustering processing again based upon the degree of similarity with adjacent areas, thereby applying noise removal processing (step S18). Control then proceeds to step S19. The details of noise removal processing will be described later.

It is determined at step S19 whether the processing of all labeled areas has ended, i.e., whether the processing of all labeled areas has been completed. If a labeled area to be processed still exists ("NO" at step S19), then control returns to step S17 and the noise-area discrimination processing of step S17 and noise-area removal processing of step S18 is repeated with regard to this area. On the other hand, if the processing of all labeled areas has already been completed and there are no labeled areas to be processed ("YES" at step S19), then control proceeds to step S20.

The vectorization unit 18 converts every area (the noise removed cluster) obtained by segmentation to vector data based upon the contour and color within the area at step S20. An example of a technique for implementing this vectorization processing is to trace the contour of the bi-level image and select the coordinate vector thereof, thereby achieving vectorization, as set forth in the specification of U.S. Pat. No. 2,885,999. It will be assumed that this technique is utilized in the vectorization processing of this embodiment.

[Example of Selection of Clip-art Image]

Figure 3:
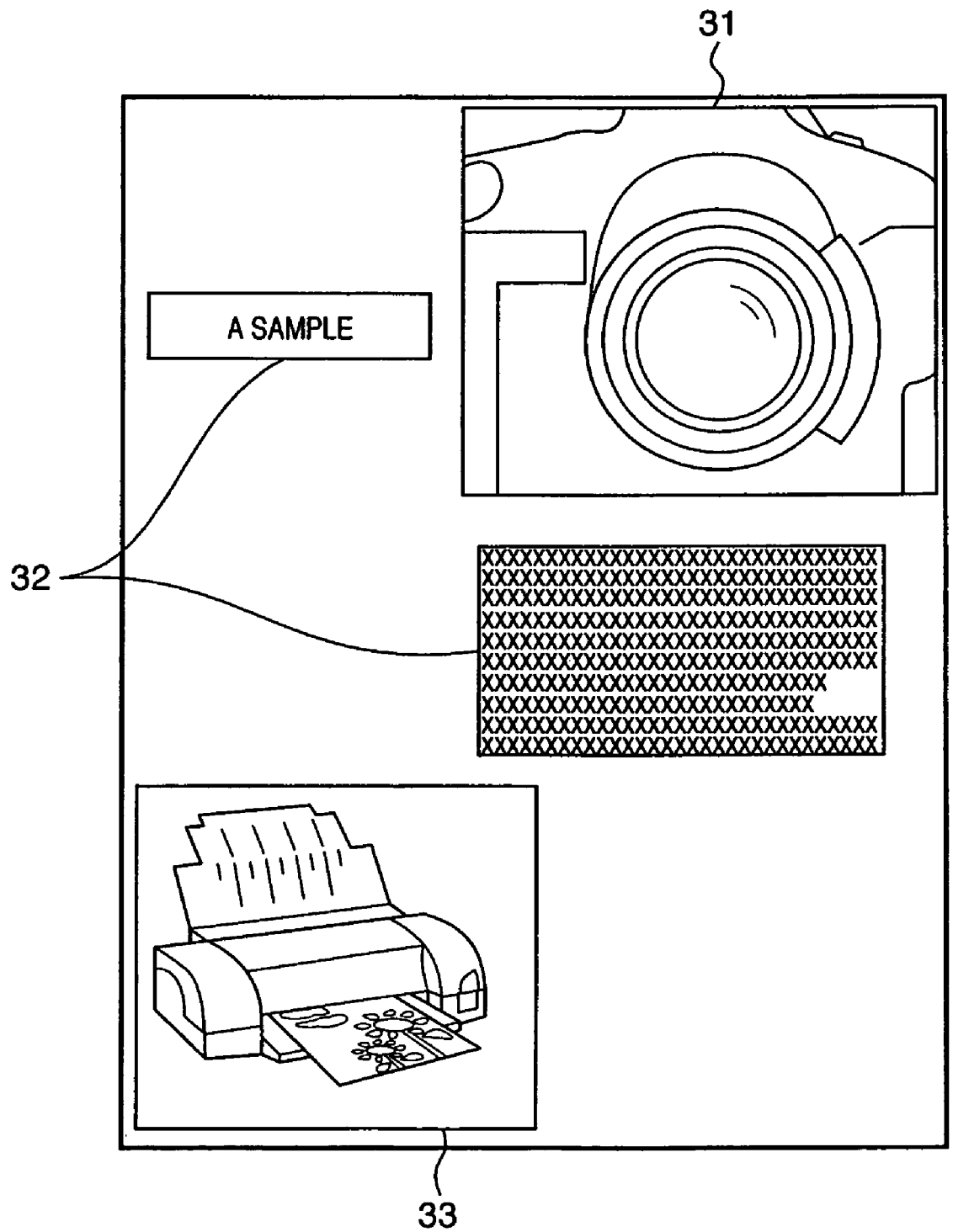
FIG. 3 is a diagram illustrating an example in which a clip-art image has been selected from a document image in image processing according to the first embodiment.

FIG. 3 is a diagram illustrating an example in which a clip-art image has been selected from a document image in image processing according to the first embodiment. FIG. 3 illustrates the manner in which a photographic area 31, text areas 32 and clip-art image 33 have been separated as rectangular areas from a single document image using the area separation method described above.

[Area Segmentation Processing]

Figure 4:
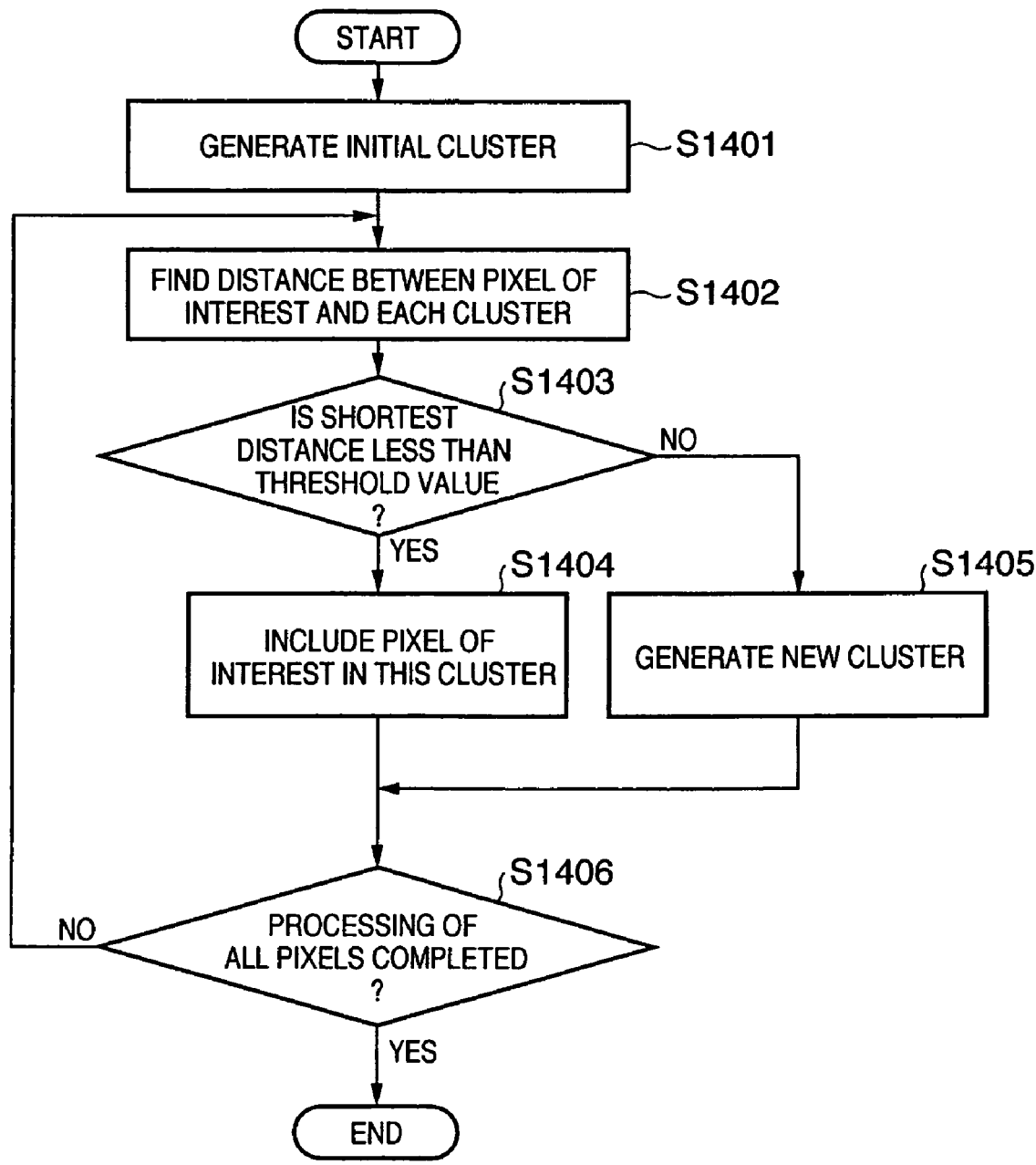
FIG. 4 is a flowchart useful in describing the details of area segmentation processing (step S14) in the flowchart shown in FIG. 2.

Area segmentation processing (step S14) in the flowchart of FIG. 2 will now be described in detail. FIG. 4 is a flowchart useful in describing the details of area segmentation processing (step S14) in the flowchart shown in FIG. 2.

An initial cluster is generated by a starting pixel obtained by raster scanning (step S1401). This is followed by obtaining degrees of similarity between the next pixel and all clusters (step S1402). Degree of similarity is the reciprocal of RGB distance, and RGB distance is Euclidean distance. This means that the higher the degree of similarity, the closer the features of the pixel and cluster. Although the color information of RGB values, for example, is used in processing for calculating degree of similarity, color-space information or information other than color may be used as a feature.

The highest degree of similarity and a cluster number corresponding to this degree of similarity are recorded and this degree of similarity is compared with a threshold value set in advance (step S1403). If the result of the comparison is that the degree of similarity is equal to or greater than the threshold value ("YES" at step S1403), then the pixel of interest is made to belong to the cluster recorded (step S1404). On the other hand, if the degree of similarity is less than the threshold value ("NO" at step S1404), then a new cluster is generated with regard to the pixel of interest (step S1405). It should be noted that if degree of similarity between the pixel and a cluster is found in the form of pixel-to-pixel distance, then a case where the degree of similarity is equal to or greater than a threshold value means that the pixel-to-pixel distance is smaller than the threshold value.

After the processing of step S1404 or S1405, it is determined whether the processing of all pixels is finished (step S1406). If it is found that an unprocessed pixel still exists ("NO" at step S1406), control returns to step S1402 and the above-described processing is executed repeatedly. If there are no unprocessed pixels ("YES" at step S1406), area segmentation processing (step S14) is terminated.

Basically, in clustering processing, the result of clustering changes and so does processing time depending upon the threshold value on degree of similarity. Consequently, if the threshold value on degree of similarity is set high, the pixel to undergo processing will not fall within the cluster and a new cluster will therefore be generated unless the degree of similarity between the pixel and the cluster of highest degree of similarity is equal to or greater than this threshold value. As a result, the number of clusters increases and processing takes a longer period of time. Further, since the number of colors used in clip-art images is limited and each of the colors is different, a somewhat reduced number of clusters (i.e., number of colors) can be obtained and processing time curtailed by clustering processing in which the threshold value on the degree of similarity is set low.

[Area Unification Processing]

Figure 5:
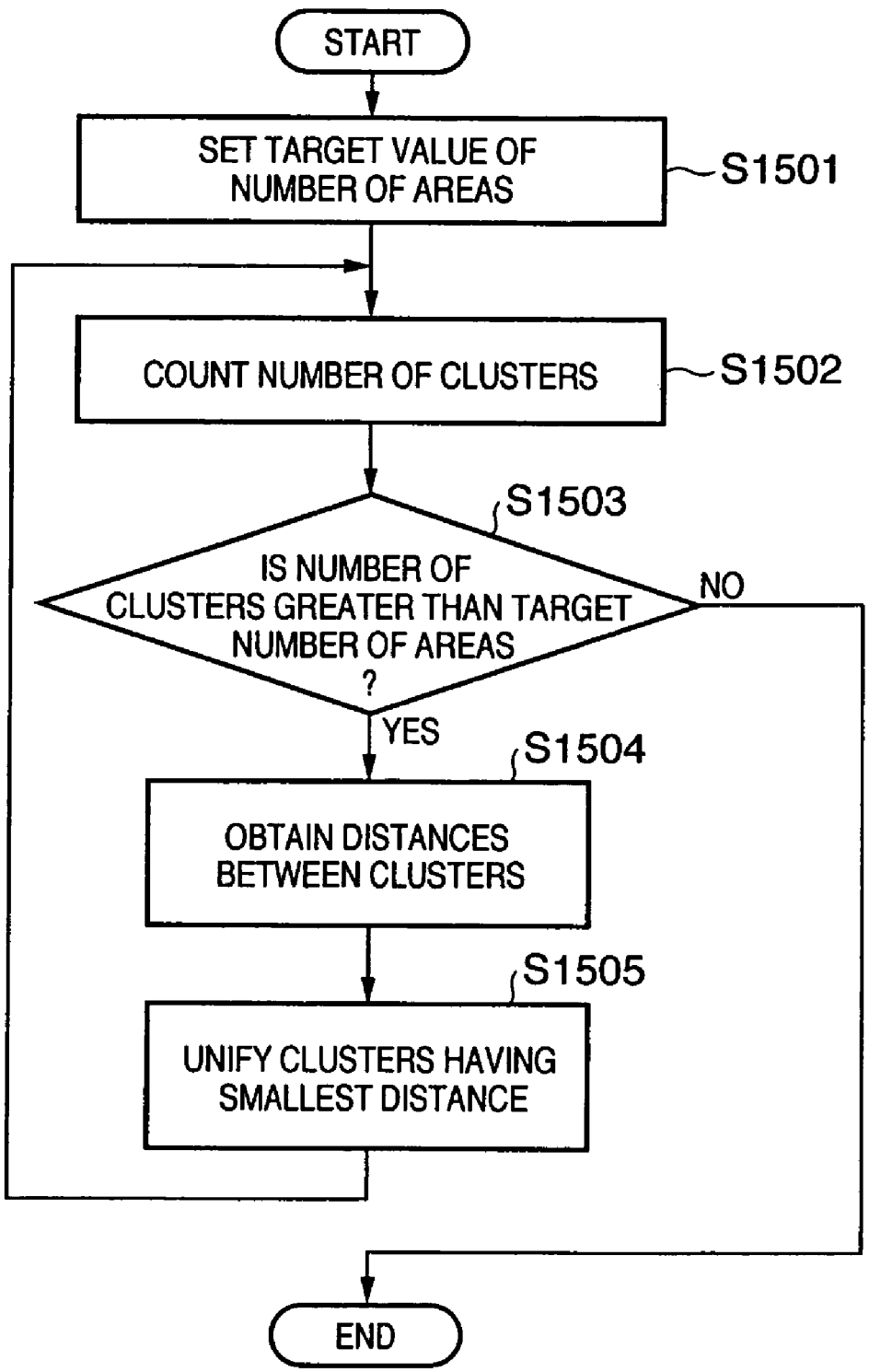
FIG. 5 is a flowchart useful in describing the details of area unification processing (step S15) in the flowchart shown in FIG. 2.

Area unification processing (step S15) in the flowchart of FIG. 2 will now be described in detail. FIG. 5 is a flowchart useful in describing the details of area unification processing (step S15) in the flowchart shown in FIG. 2.

First, a target value of number of areas finally obtained by separation is set (input) (step S1501). In this embodiment, into how many colors an image is separated is adopted as a guideline. Next, the present number of clusters is counted (step S1502). The present number of clusters counted is compared with the set target value (step S1503).

If the result of the comparison is that the present number of clusters is greater than the target value ("YES" at step S1503), cluster unification is performed. In this embodiment, cluster unification processing includes first calculating degrees of similarity (distances) between clusters (step S1504), adopting two clusters having the highest degree of similarity (two clusters between which the distance is shortest) from these as clusters to undergo unification processing, and unifying these two clusters into a single cluster (step S1505).

Following the end of processing for unifying the two clusters, control returns to step S1502 and the above-described processing is executed repeatedly with regard to the group of clusters present after unification processing. If it is determined at step S1503 that the present number of clusters is less than the set target value ("NO" at step S1503), then area unification processing is exited (step S15).

[Noise Discrimination Processing]

Figure 6:
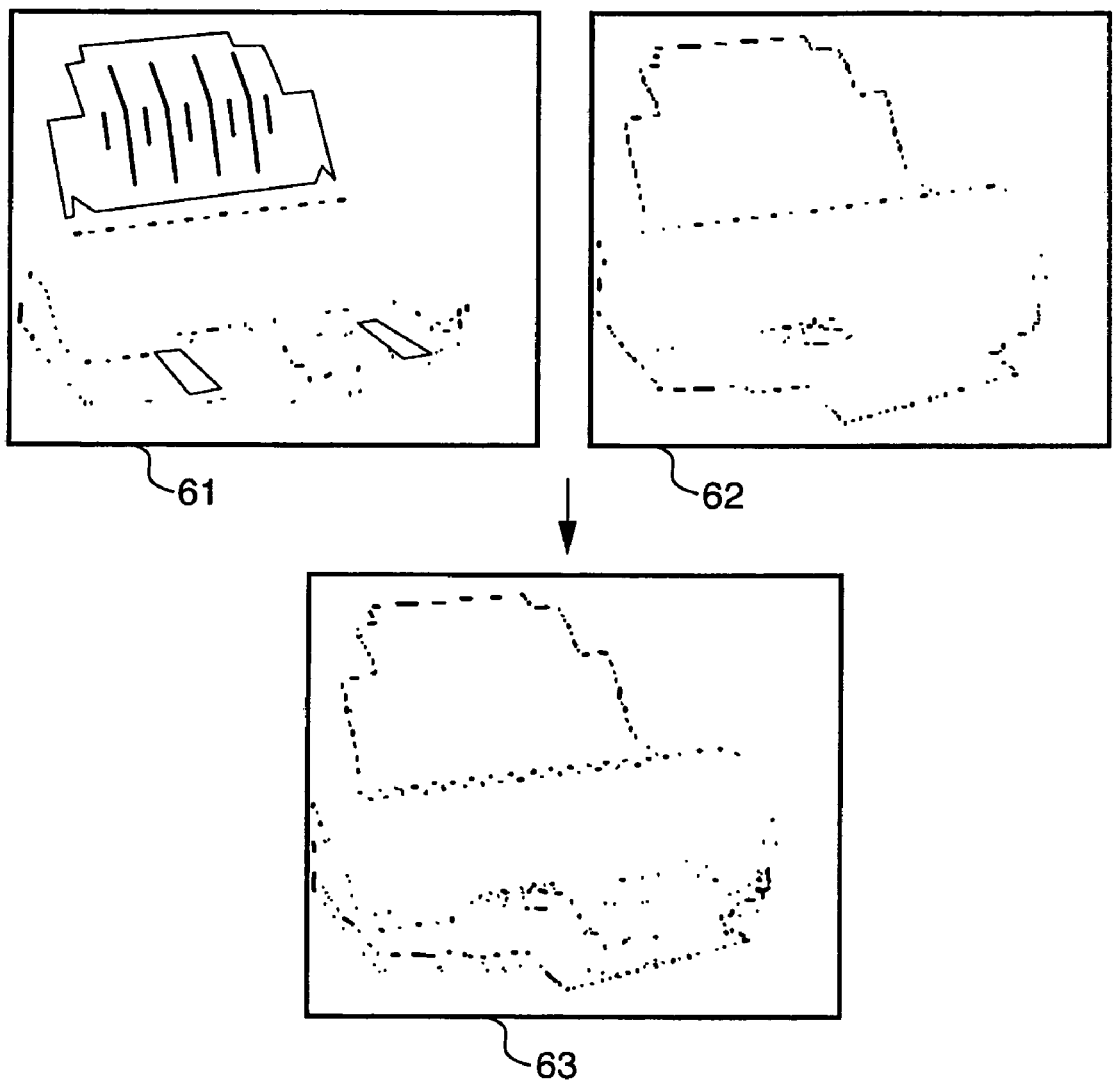
FIG. 6 is a diagram useful in describing the details of noise discrimination processing (step S17) in the flowchart shown in FIG. 2.

Noise discrimination processing (step S17) in the flowchart of FIG. 2 will now be described in detail with reference to FIG. 6. FIG. 6 is a diagram useful in describing the details of noise discrimination processing (step S17) in the flowchart shown in FIG. 2.

Clusters 61 and 62 in FIG. 6 are examples of two clusters selected as representatives from clusters present after the execution of area segmentation processing (step S14) and are unification processing (step S15). These clusters 61 and 62 shown in FIG. 6 contain large numbers of small areas. If on the basis of the contours of every small area and the color information within every small area, every cluster were to be converted as is to vector data for all of the small areas, the amount of data would be enormous and would be a problem. In order to solve this problem, the results of area segmentation are labeled (step 16), as mentioned above. It is determined on the basis of whether or not size of an labeled area (small area included in a cluster) is smaller than a predetermined threshold, whether or not the labeled area is a noise area (step S17). As a result, a noise area determined from these clusters is shown as 63 in FIG. 6. These areas are subjected to noise removal processing.

[Noise Removal Processing]

Figure 7:
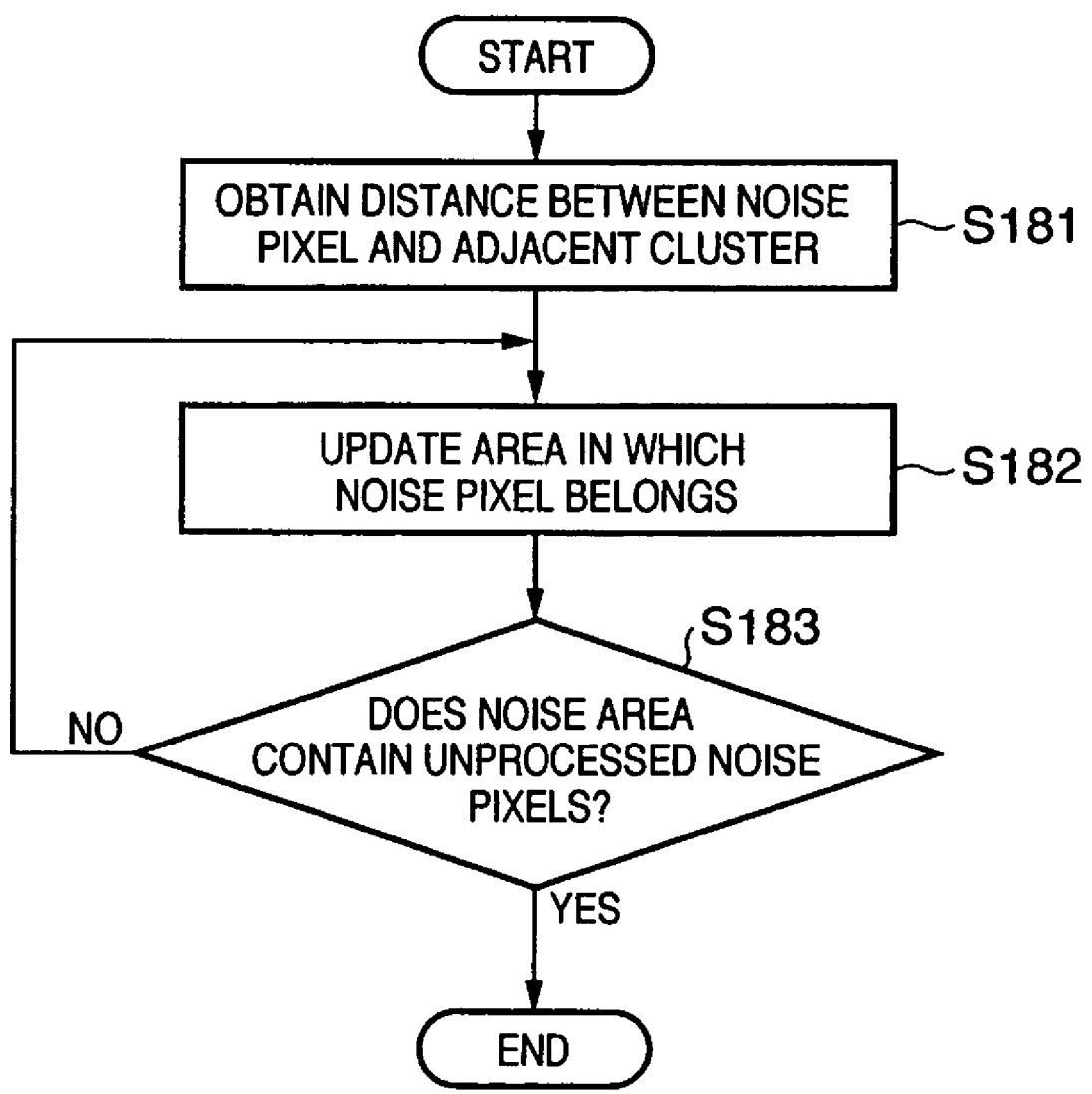
FIG. 7 is a flowchart useful in describing the details of noise removal processing (step S18) in the flowchart shown in FIG. 2.

Noise removal processing (step S18) in the flowchart of FIG. 2 will now be described in detail. FIG. 7 is a flowchart useful in describing the details of noise removal processing (step S18) in the flowchart shown in FIG. 2. In noise removal processing, noise areas discriminated in noise discrimination processing (step S17) are made the target of noise removal and removal processing is executed for every pixel contained in noise areas.

First, the degree of similarity between a noise pixel and each adjacent cluster (e.g., the distance between the noise pixel and each adjacent area) is calculated (step S181). Next, the noise pixel is made to belong to the cluster having the highest degree of similarity among the calculated degrees of similarity (the noise pixel is unified with the cluster having the highest degree of similarity), thereby updating the area to which the noise pixel belongs (step S182). It is then determined whether unprocessed noise pixels exist in the noise area (step S183).

If the result of the determination is that unprocessed noise pixels exist ("YES" at step S183), then control returns to step S181 and the above-described processing is executed repeatedly. On the other hand, if no unprocessed noise pixels exist ("NO" at step S183), then noise removal processing in this noise area is terminated.

[Example of Vectorization Based Upon Area Segmentation of Clip-art Image]

FIG. 8 is a diagram illustrating an example of vectorization that is based upon area segmentation of a clip-art image according to an embodiment of the present invention. Reference numerals 81 and 82 in FIG. 8 denote a clip-art image to undergo area segmentation and one example of results of area segmentation, respectively. More specifically, by the series of processing operations that include area segmentation, area unification, noise discrimination and noise removal described above, the clip-art image 81 is segmented into a cluster group of 16 clusters, which are indicated as the area segmentation result 82, in a case where 16 has been set as the target value on number of areas into which segmentation is desired.

A cluster 83, contours 84 and internal-color information 85 are indicated in FIG. 8 as examples of cluster contours and internal-color information necessary for vectorization processing. The result of converting the area segmentation result 82 into vector data based upon the above-mentioned information is a vector image 86. The file size of the vector image 86 is 24 KB and the file size of the original clip-art image 81 is 2739 KB. As a result of vectorization, therefore, file size is reduced to less than 1/100 of the original. Further, processing such as for filling in the internal colors of the clusters can also be executed by adopting each cluster in the area segmentation result 82 of vector image 86 as a component part.

In accordance with this embodiment, as described above, noise can be eliminated effectively by re-clustering processing (combine process for combining adjacent areas) to noise areas that have been discriminated by labeling processing. In addition, the amount of data can be reduced by vectorizing the results of area segmentation obtained after noise removal.

Second Embodiment

A second embodiment of the present invention will now be described.

The first embodiment set forth above illustrates an example in which it is determined whether an area is a noise area depending upon the size of a labeled area (a small area) after labeling processing. In a second embodiment, which is intended to prevent the removal of valuable information in an image, reference will be had to FIG. 9 to describe an example in which after a noise area has been discriminated based upon the size of a labeled area, further use is made of other information to determine whether the area is a noise area. It should be noted that the structure of the image processing apparatus having the function for executing vectorization processing based upon area segmentation in the second embodiment is similar to that of the image processing apparatus according to the first embodiment.

Figure 9:
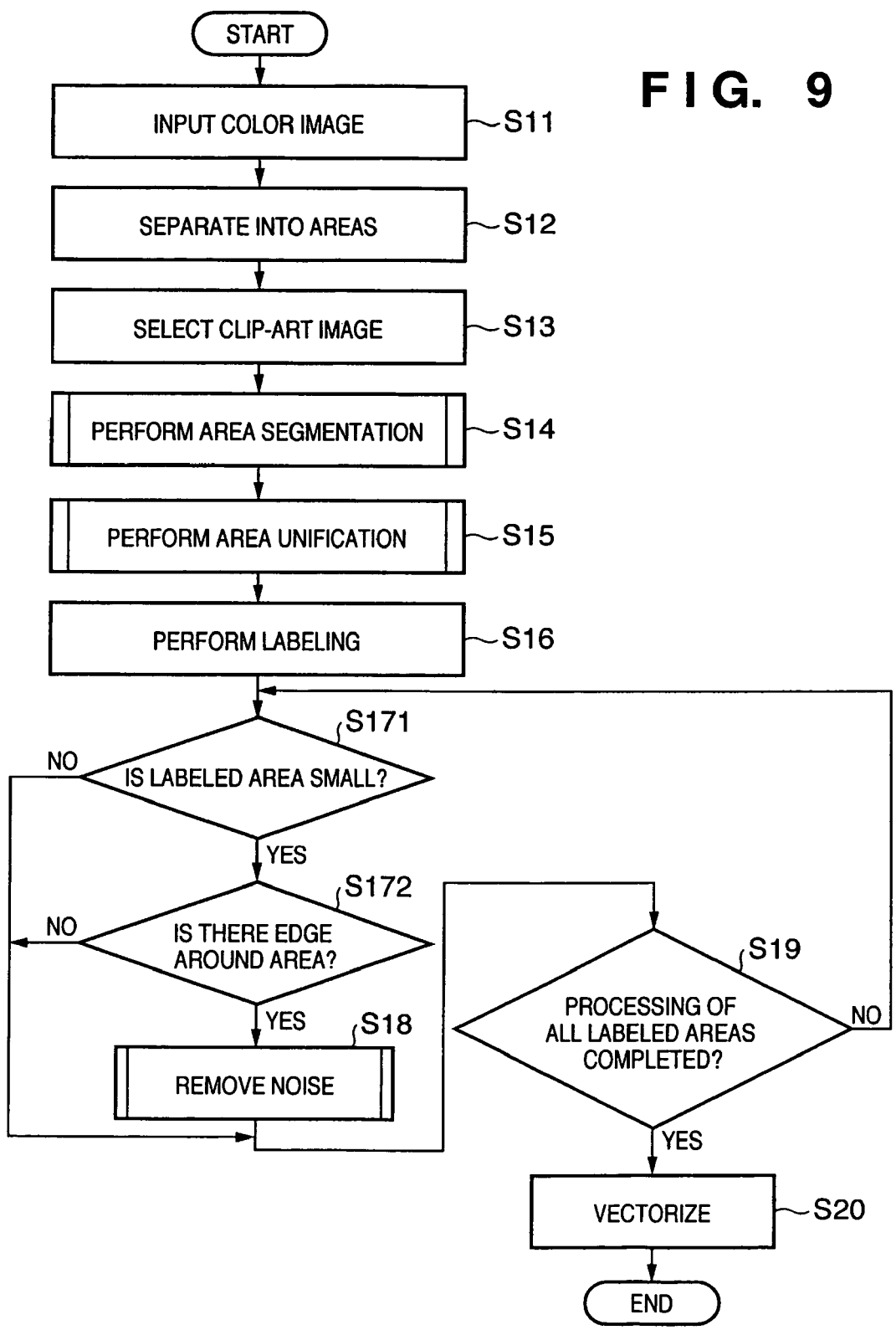
FIG. 9 is a flowchart useful in describing the details of vectorization processing that is based upon area segmentation of a clip-art image according to a second embodiment of the present invention.

FIG. 9 is a flowchart useful in describing the details of vectorization processing that is based upon area segmentation of a clip-art image according to a second embodiment of the present invention. Steps S171 and S172 in the flowchart of FIG. 9 correspond to the noise area discriminator of the second embodiment; the other steps are the same as the identically numbered steps of the first embodiment.

Whether an area is a candidate for a noise area is discriminated at step S171 depending upon the size of the labeled area. If the result is that the labeled area is not small ("NO" at step S171), then it is judged that the area is not a noise area and control transitions to the processing of step S19. On the other hand, if it is determined that the labeled area is small ("YES" at step S171), then this area is recorded as a noise-area candidate and control transitions to the processing of step S172.

It is positively determined at step S172 whether the noise-area candidate recorded at step S171 is a noise area based upon whether or not there is an edge around it. If the result of the determination is that there are edge pixels around the noise-area candidate ("YES" at step S172), then it is decided that the area is a noise area and control proceeds to noise reduction processing at step S18. On the other hand, if there are no strong edge pixels around the noise-area candidate ("NO" at step S172), then it is decided that the area is not a noise area and control proceeds to the processing of step S19. It should be noted that an edge pixel refers to a pixel that exhibits a major change in color or luminance from adjacent pixels. By way of example, an edge can be discriminated by using a Sobel filter. Here whether noise is present or not is judged by taking note of the scanner characteristic or JPEG compression characteristic that noise readily occurs along the neighborhood of an edge.

Further, it may be so arranged that with regard to a noise-area candidate that has been discriminated based upon the size of a labeled area in addition to edge information, the determination as to whether the area is a noise area is made based upon the positional relationship between the area and surrounding areas. That is, if a large labelled area is present in the vicinity of a small labeled area of the same color, then the small labeled area is judged positively to be a noise area.

In accordance with the first and second embodiments above, the contour of each area is ascertained accurately by area segmentation processing to which noise removal has been applied, thereby enabling an improvement in image quality. Furthermore, the amount of data for describing vectorization of each area contour is reduced and the parts of an excellent image can be obtained.

Third Embodiment

Figure 11:
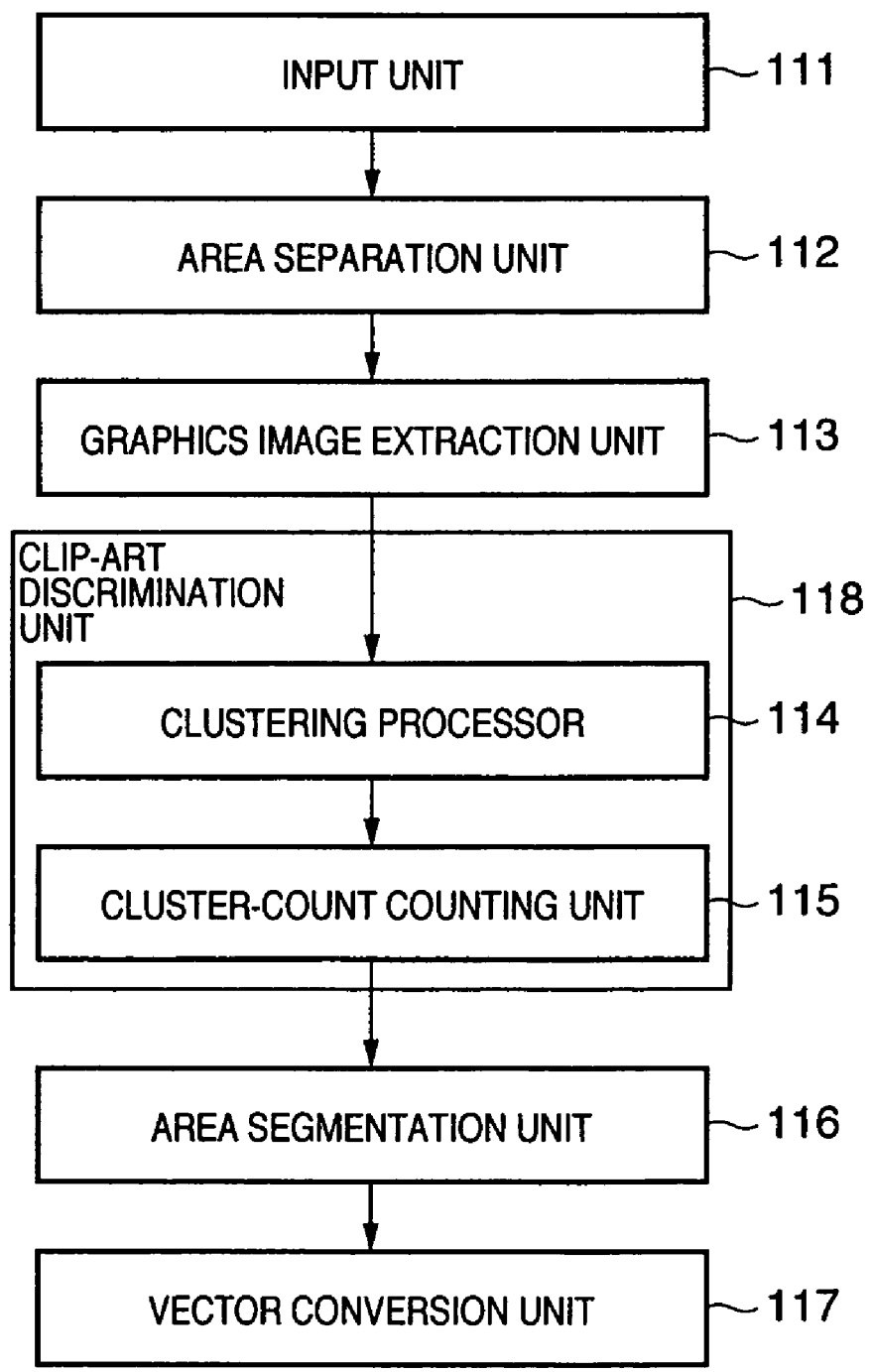
FIG. 11 is a block diagram illustrating the structure of an image processing apparatus for executing vectorization processing based upon area segmentation according to a third embodiment of the present invention.

FIG. 11 is a block diagram illustrating the structure of an image processing apparatus for executing vectorization processing based upon area segmentation according to a third embodiment of the present invention. As shown in FIG. 11, the apparatus includes a input unit 111 for inputting a document image; an area separation unit 112 for separating the document image into areas such as text and photographic areas; a graphics image extraction unit 113 for extracting a portion having a graphics attribute from the results of area segmentation; a clustering processor 114 for subjecting graphics to clustering processing in order to discriminate clip-art images (illustrated images); and a cluster-count counting unit 115 for counting the number of clusters in the results of clustering in order to discriminate clip-art images. It should be noted that the clustering processor 114 and cluster-count counting unit 115 construct a clip-art discrimination unit 118. The apparatus further includes an area segmentation unit 116 for applying area segmentation to an image discriminated to be a clip-art image; and a vector conversion unit 117 for converting the results of area segmentation to vector data.

As the main components of the digital MFP embodying the image processing apparatus of FIG. 11 are similar to those described above in the first embodiment with reference to FIG. 1D, these need not be described again.

Figure 12:
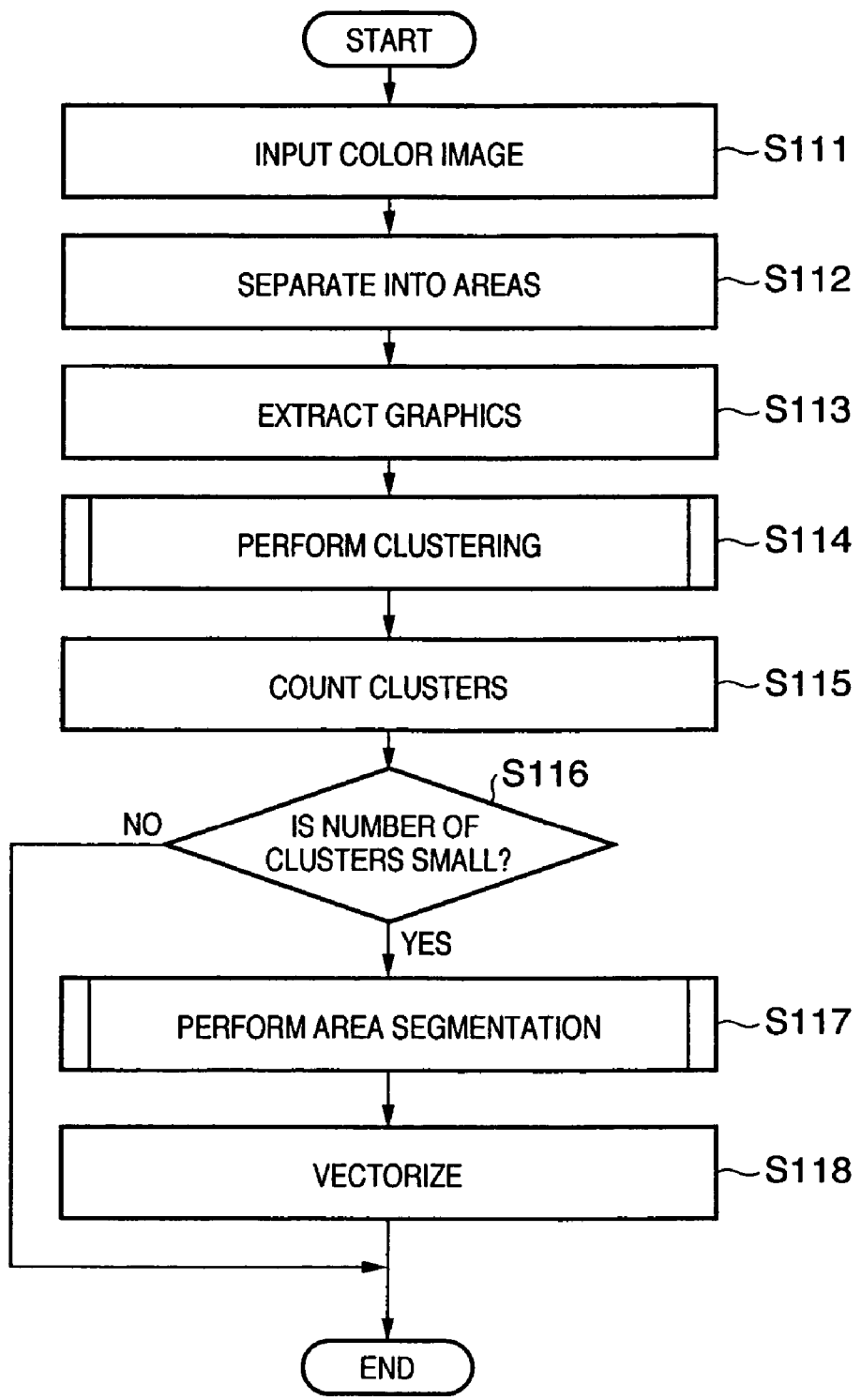
FIG. 12 is a flowchart useful in describing an overview of vectorization processing that is based upon area segmentation by the image processing apparatus according to the third embodiment.

FIG. 12 is a flowchart useful in describing an overview of vectorization processing that is based upon area segmentation in the third embodiment.

First, a document image is input at the input unit 111 (step S111). Next, the area separation unit 112 executes area separation processing to separate the document image into areas such as text and photographic areas (step S112). A well-known method disclosed by way of example in the specification of Japanese Patent Application Laid-Open No. 2002-314806 can be used as the area segmentation method.

Next, the graphics extraction unit 113 extracts an area having a graphics attribute from the results of area separation processing (step S113). The results of area separation processing in the third embodiment appear in a manner similar to that shown in FIG. 3.

Next, the clip-art discrimination unit 118 executes processing for discriminating clip-art images. First, based upon the color feature, the clustering processor 114 in the clip-art discrimination unit 118 executes clustering processing to set the degree-of-similarity threshold value low and segment and the image coarsely (step S114). The details of this clustering processing are similar to those of the area segmentation processing set forth above with reference to FIG. 4 and need not be described again.

Next, the cluster-count counting unit 115 in the clip-art discrimination unit 118 calculates the number of clusters obtained by segmentation from the results of clustering (step S115). Next, by utilizing the characteristic that a clip-art image has a limited number of colors and checking whether the number of clusters is small, it is determined whether the image is a clip-art image (step S116). If the number of clusters is determined to be small ("YES" at step S116), then it is judged that the image is a clip-art image and control proceeds to step S117; otherwise ("NO" at step S116), it is judged that the image is not a clip-art image. The details of clustering processing for clip-art image discrimination will be described later with reference to FIG. 14.

The image that has been determined to be a clip-art image is subjected to area segmentation processing in the area segmentation unit 116 at step S117.

Next, the vector conversion unit 117 executes vectorization to convert the results of area segmentation to vector data (step S118). It should be noted that vectorization processing can employ a well-known Bezier approximation or smoothing processing, etc.

[Area Segmentation Processing]

Figure 13:
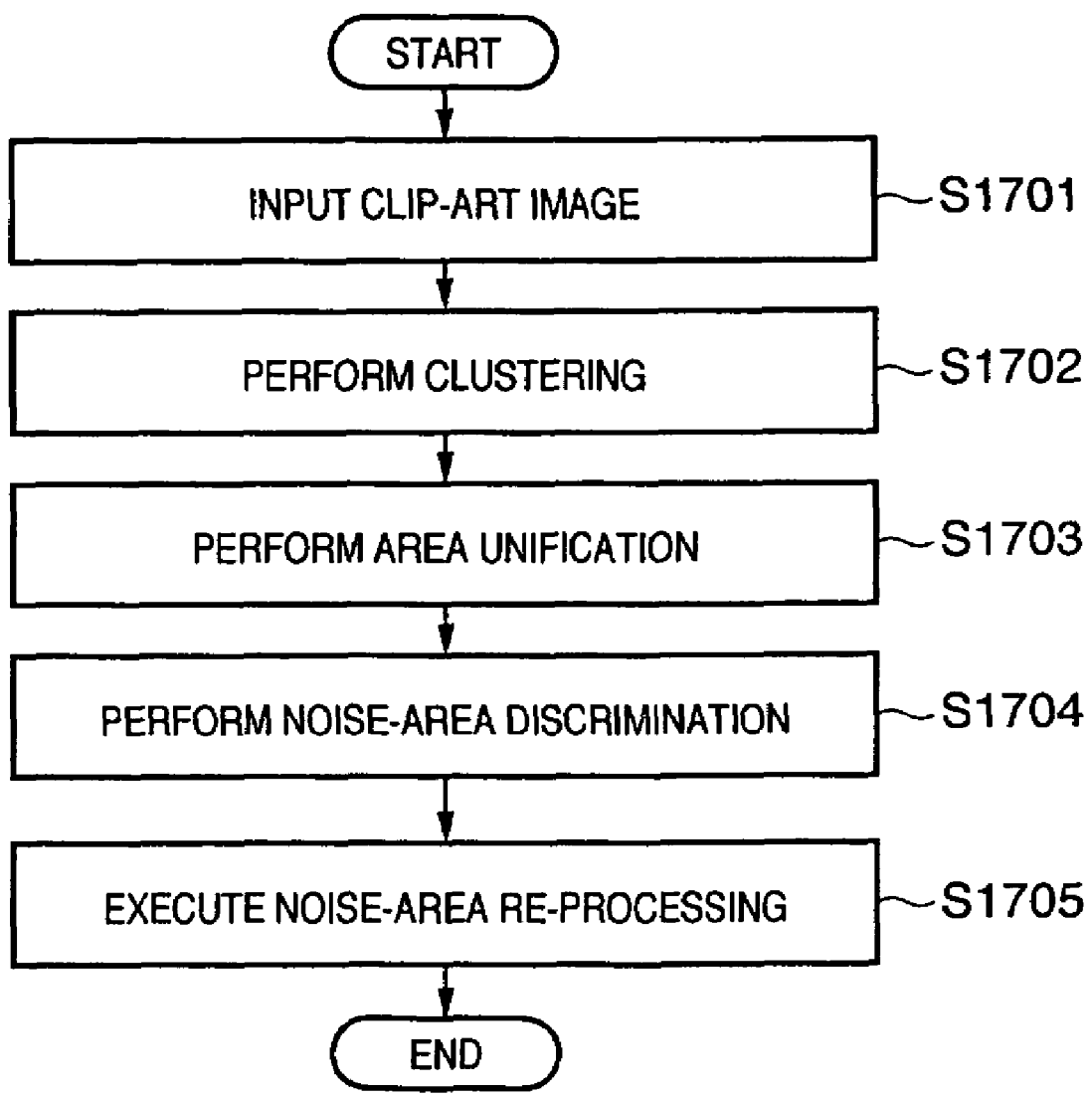
FIG. 13 is a flowchart useful in describing the details of area segmentation processing according to the third embodiment.

FIG. 13 is a flowchart useful in describing the details of area segmentation processing (step S117) according to the third embodiment.

First, an image discriminated as a clip-art image by the clip-art image discrimination processing of step S114 is input as an image to be processed (step S1701). This image to be processed is then subjected to clustering processing for the purpose of area segmentation (step S1702). With regard to clustering processing for the purpose of area segmentation, the processing per se is the same as clustering processing for the purpose of discriminating a clip-art image. However, since it is necessary to segment the image into clusters finely so as to eventually obtain accurate area segmentation results, the threshold value on degree of similarity is set higher.

Area unification processing is executed based upon the results of clustering processing (step 1703). In this processing, a target value on number of areas desired to be obtained by separation (the target number of clusters), namely a guideline as to how many colors an image should be separated into, is input. The present number of clusters is then counted and is compared with the target value of number of areas. Cluster unification is performed if the result of the comparison is that the present number of clusters is greater than the target value. Unification processing includes calculating degrees of similarity between clusters, adopting two clusters having the highest degree of similarity from these as clusters, and unifying these two clusters into a single cluster. It should be noted that area unification processing is executed repeatedly until the present number of clusters falls below the target value.

Noise-area discrimination processing is executed based upon the results of area unification processing (step S1704). This processing includes first labeling the results of area segmentation and calculating the area of each labeled area. The area of a labeled area is taken to be the number of pixels present in the area. If the area of a labeled area is less than a certain threshold value, then this area is judged to be a noise area.

Next, for every pixel contained in the area, the degree of similarity between the pixel and an area adjacent to the periphery thereof is calculated and a pixel to undergo processing is made to belong to the area having the highest degree of similarity (step S1705). It should be noted that noise-area discrimination processing is executed repeatedly until all labeled areas has been processed. A graphics area resulting from area separation of a document image can be compressed effectively and stored, and the above-described noise-area discrimination processing and noise-area re-processing constitute ideal counter-measures for dealing with noise produced by the effects of compression.

Results of vectorization processing that is based upon area segmentation of a clip-art image in the third embodiment of the invention is similar to that of the first embodiment (FIG. 8).

In accordance with the third embodiment, as described above, a graphics area obtained by area separation from a document image is subjected to clustering processing in which the threshold value on degree of similarity has been set low and the number of clusters is counted, thereby making it possible to speed up and simplify the discrimination of clip-art images. Further, by ideally vectorizing only images discriminated as being clip-art images, it is possible to realize the high compression of images with the minimum amount of decline in image quality.

Fourth Embodiment

In a graphics area extracted following the separation of a document image into areas, there are cases where one comes across an image having a small number of colors, as in the manner of a clip-art image. There are instances where such an image cannot be discriminated correctly based upon the number of clusters in clustering processing. In a fourth embodiment, therefore, discrimination does not rely upon number of clusters. Instead, since the cluster of each color of a clip-art image is a mass of pixels the colors of which are relatively close together, use is made of a clip-art discrimination requirement that utilizes a certain characteristic of a cluster, namely the fact that the color variance value of a sample is low.

Figure 14:
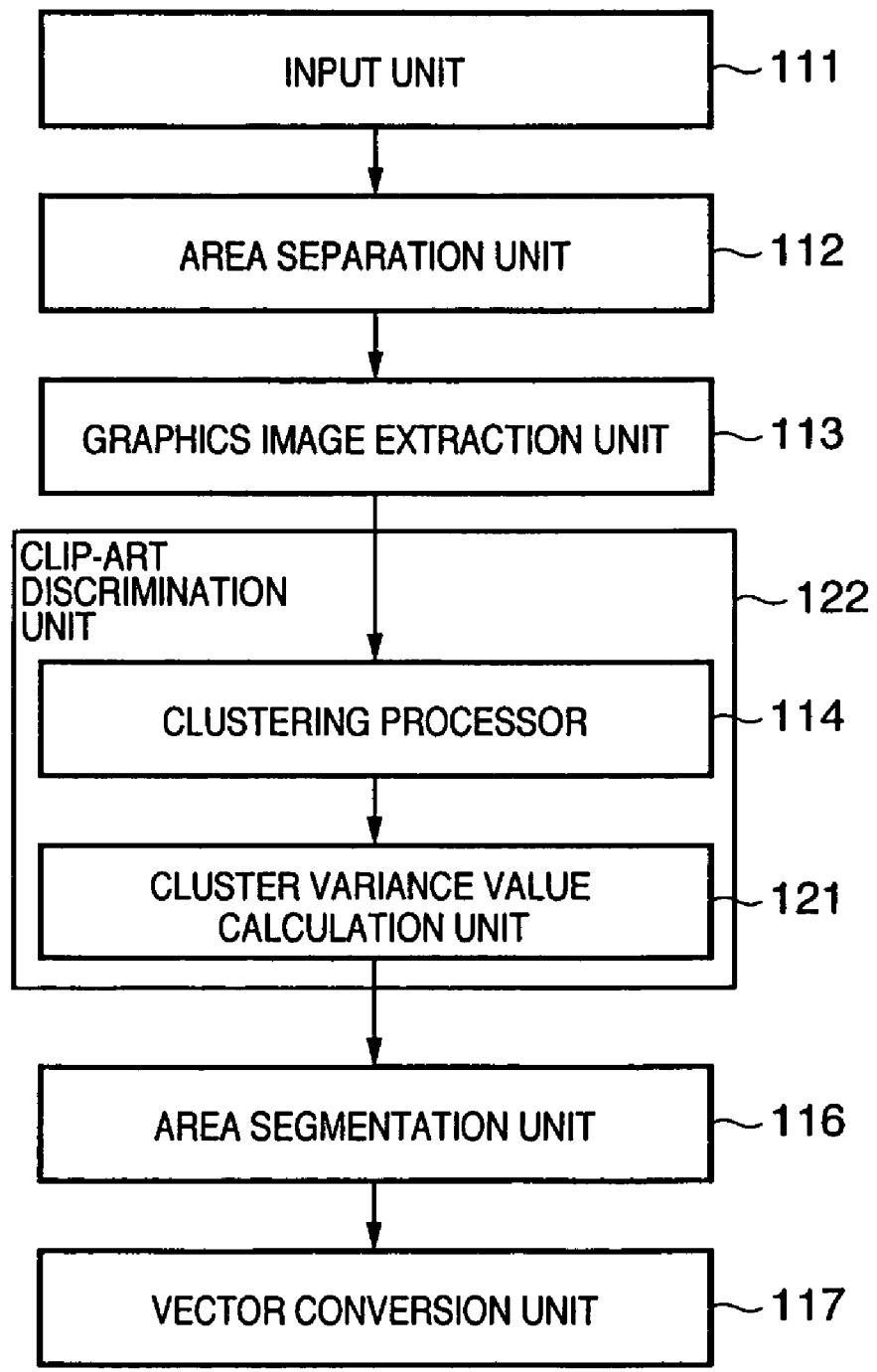
FIG. 14 is a block diagram illustrating the structure of an image processing apparatus for executing vectorization processing based upon area segmentation according to a fourth embodiment of the present invention.

FIG. 14 is a block diagram illustrating the structure of an image processing apparatus for executing vectorization processing based upon area segmentation according to a fourth embodiment of the present invention. The apparatus includes a cluster variance value calculation unit 121 for calculating a color variance value of a sample in each cluster from results of clustering in order to discriminate a clip-art image. The structure of the apparatus is similar to that of FIG. 11 except for the fact that the apparatus in this embodiment is devoid of the cluster-count counting unit 115. Accordingly, blocks that execute identical processing are designated by like reference characters and need not be described again. It should be noted that the clustering processor 114 and cluster variance value calculation unit 121 construct a clip-art discrimination unit 122. In other words, the image processing apparatus of the fourth embodiment is provided with the cluster variance value calculation unit 121 instead of the cluster-count counting unit 115.

Figure 15:
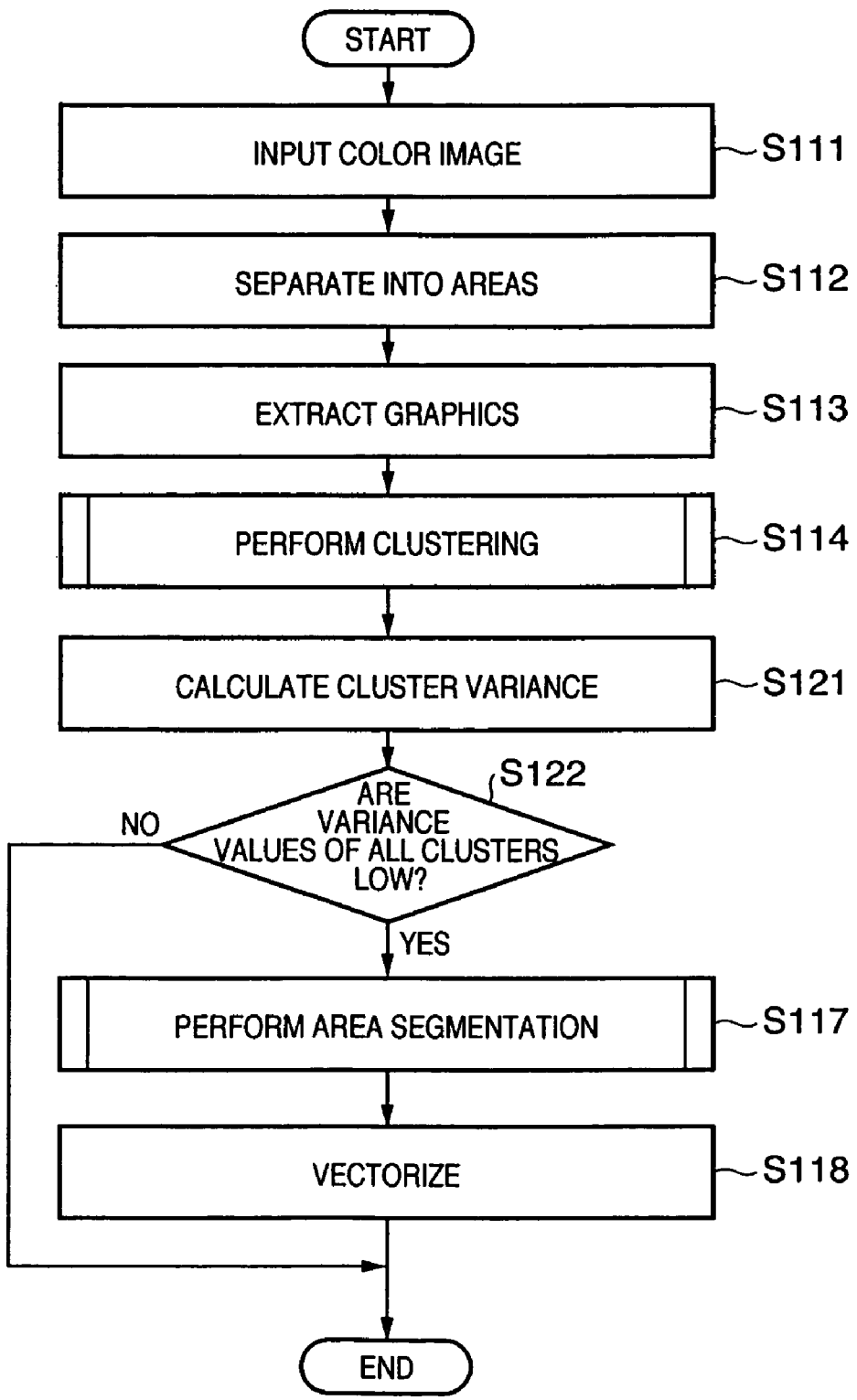
FIG. 15 is a flowchart useful in describing an overview of vectorization processing that is based upon area segmentation by the image processing apparatus according to the fourth embodiment.

FIG. 15 is a flowchart useful in describing an overview of vectorization processing that is based upon area segmentation by the image processing apparatus according to the fourth embodiment.

First, a document image is input at the input unit 111 (step S111). Next, the area separation unit 112 executes area separation processing to separate the document image into areas such as text and photographic areas (step S112). The graphics extraction unit 113 then extracts an area having a graphics attribute from the results of area separation processing (step S113).

Next, the clip-art discrimination unit 122 executes processing for discriminating clip-art images. Accordingly, based upon the color feature, the clustering processor 114 in the clip-art discrimination unit 122 executes clustering processing to set the degree-of-similarity threshold value low and segment and the image coarsely (step S114). Next, from the results of clustering processing, the cluster variance value calculation unit 121 in the clip-art discrimination unit 122 calculates a sample variance value in each cluster that has been obtained by segmentation (step S121). Whether the image is a clip-art image is determined by observing the variance value of each cluster (step S122). If the variance values of the clusters are all low ("YES" at step S122), then it is judged that the image is a clip-art image and control proceeds to step S117; otherwise ("NO" at step S122), it is judged that the image is not a clip-art image.

The image that has been determined to be a clip-art image is subjected to area segmentation processing in the area segmentation unit 116 at step S117. The vector conversion unit 117 executes vectorization processing to convert the results of area segmentation to vector data (step S118).

Thus, only the processing for calculating the cluster variance value at step S121 in order to discriminate clip-art images differs from the processing steps of the third embodiment. Accordingly, only this processing will be described below.

[Processing for Calculating Cluster Variance Value in Order to Discriminate Clip-art Images]

Figure 16:
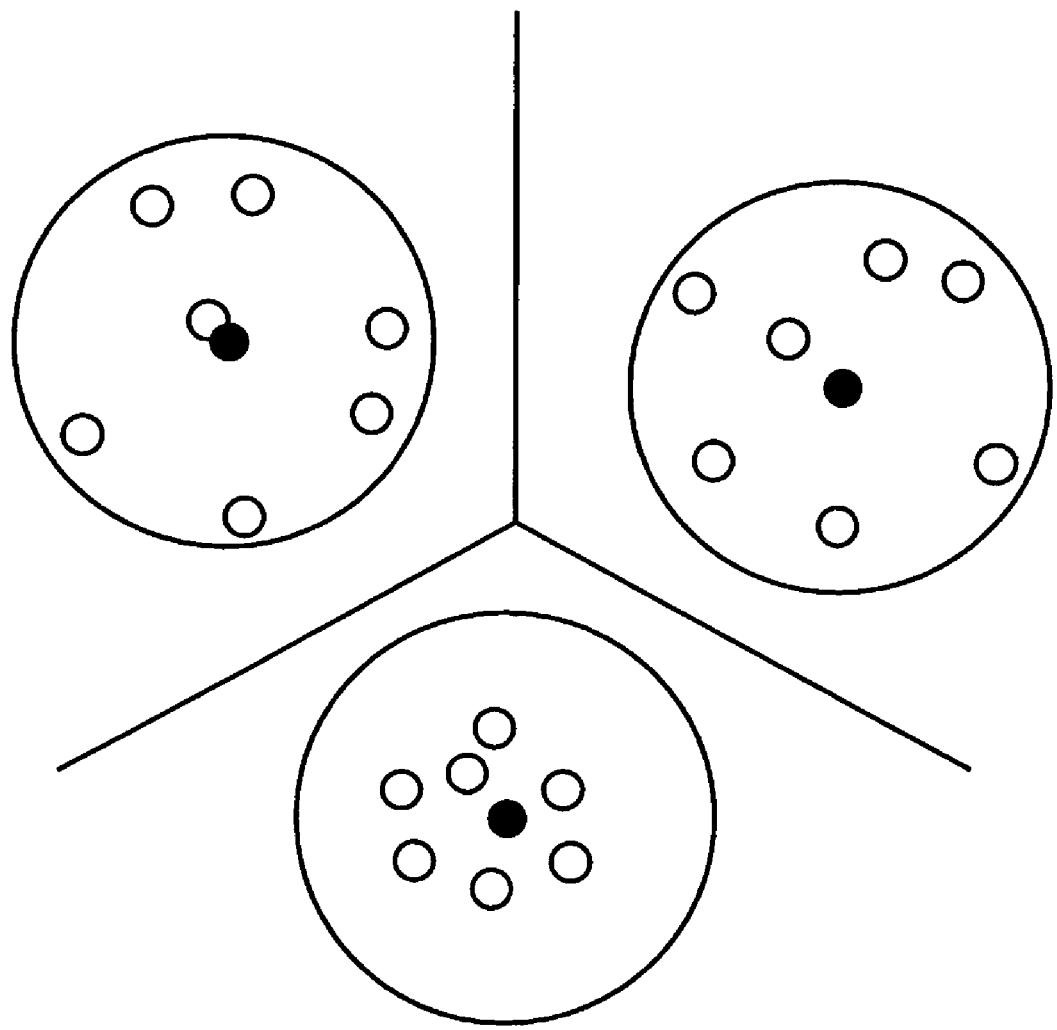
FIG. 16 is a diagram illustrating an example of clustering processing in which an image has been divided into three clusters.

Clustering processing for discriminating clip-art images segments an image into several clusters. FIG. 16 is a diagram illustrating an example of clustering processing in which an image has been divided into three clusters. The three circles in FIG. 16 indicate three clusters and the black dot in each circle indicates the center of the cluster. The white dots in each circle indicate pixels that belong to the cluster. The position of each pixel and the position of the center indicate the degree of similarity between the pixel and the center.

In order to describe processing for calculating a cluster variance value, a case where an image has been divided into N clusters utilizing RGB color information will be taken as an example. First, the center $(R_i, G_i, B_i)$ of each cluster is calculated. The center of each cluster is the average value of RGB of each pixel that belongs to the cluster and is calculated according to Equation (1) below.

$$R_i = \Sigma_{i,j} R_{i,j}/n_i \ G_i = \Sigma_{i,j} G_{i,j}/n_i \} \ B_i = \Sigma_{i,j} B_{i,j}/n_i \quad (1)$$

Here $n_i$ represents the number of pixels that belong in an ith cluster, and $R_{i,j}$, $G_{i,j}$, $B_{i,j}$ represent the color values of a jth pixel that belongs to the ith cluster.

Next, a variance value $\sigma_i$ of each cluster is calculated. The variance value of each cluster is the average of the squares of the differences between the RGB values of each pixel that belongs to the cluster and the center value of the cluster and is calculated according to Equation (2) below.

$$\sigma_i = \Sigma_{i,j}[(R_i - R_{ij})^2 + (G_i - G_{ij})^2 + (B_i - B_{ij})^2]/n_i \quad (2)$$

Thus, the variance value of each cluster is found by the above-described processing and discrimination of clip-art images is performed.

In accordance with the fourth embodiment, as described above, a graphics area obtained by area separation from a document image is subjected to clustering processing, in which the threshold value on degree of similarity has been set low, and the sample variance value of each cluster is then found, thereby making it possible to accurately discriminate an image that has a small number of clusters but that is not a clip-art image.

Fifth Embodiment

In a graphics area extracted following the separation of a document image into areas, there are cases where one comes across an image having a small number of colors but a high variance value for a certain cluster, or an image having a large number of colors but a low variance value for each cluster, as in the manner of a clip-art image. In such cases there is the possibility that judgment based upon mere number of pixels and judgment based upon mere sample variance value of a cluster will not be appropriate. Accordingly, it is necessary to discriminate whether an image is a clip-art image by combining the criteria of number of pixels and cluster variance value.

Figure 17:
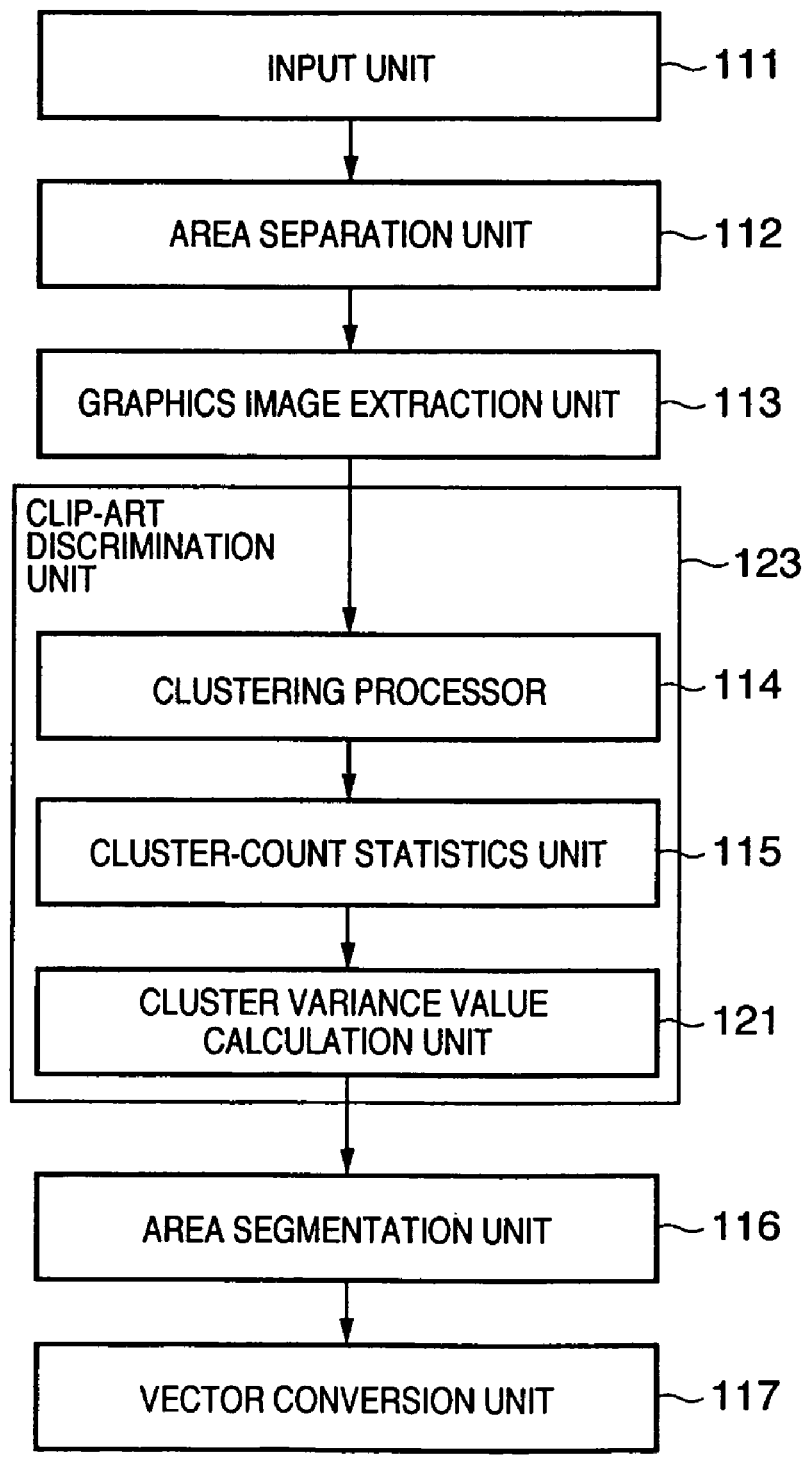
FIG. 17 is a block diagram illustrating the structure of an image processing apparatus for executing vectorization processing based upon area segmentation by an image processing apparatus according to a fifth embodiment of the present invention.

FIG. 17 is a block diagram illustrating the structure of an image processing apparatus for executing vectorization processing based upon area segmentation by an image processing apparatus according to a fifth embodiment of the present invention. The structure of the apparatus according to the fifth embodiment is obtained by adding the cluster-count counting unit 115 to the structure (FIG. 14) of the fourth embodiment. The clustering processor 114, cluster-count counting unit 115 and cluster variance value calculation unit 121 construct a clip-art discrimination unit 123.

Figure 18:
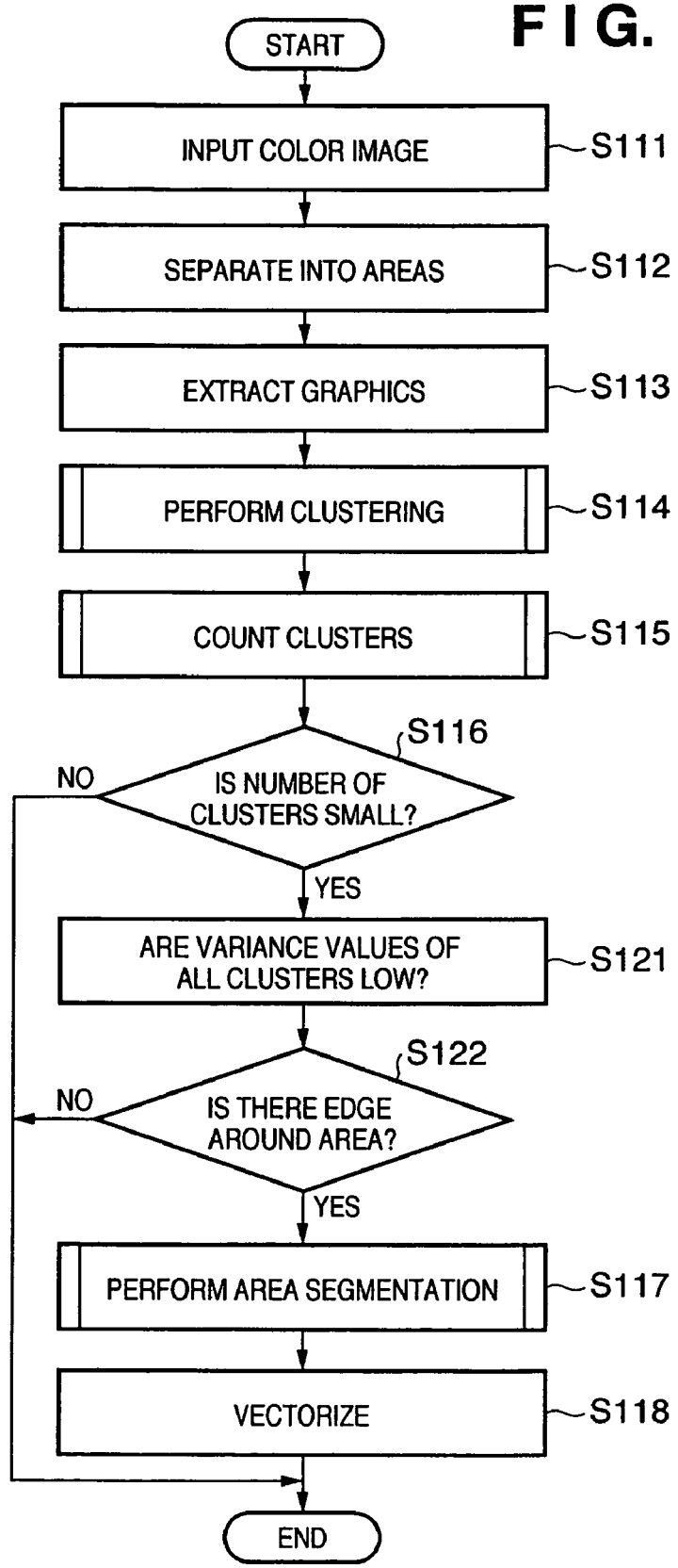
FIG. 18 is a flowchart useful in describing an overview of vectorization processing that is based upon area segmentation by the image processing apparatus according to the fifth embodiment.

FIG. 18 is a flowchart useful in describing an overview of vectorization processing that is based upon area segmentation by the image processing apparatus according to the fifth embodiment. Processing similar to that of the first and fourth embodiments will be described using like reference characters.

First, a document image is input at the input unit 111 (step S111). Next, the area separation unit 112 executes area separation processing to separate the document image into areas such as text and photographic areas (step S112). The graphics extraction unit 113 then extracts an area having a graphics attribute from the results of area separation processing (step S113).

Next, at steps S114 to S116, steps S121 and S122, the clip-art discrimination unit 123 executes processing for discriminating clip-art images. First, based upon the color feature, the clustering processor 114 in the clip-art discrimination unit 123 executes clustering processing to set the degree-of-similarity threshold value low and segment and the image coarsely (step S114). Next, from the results of clustering processing, the cluster-count counting unit 115 in the clip-art discrimination unit 123 counts the number of clusters that have been obtained by segmentation. Furthermore, whether the image is a clip-art image is determined by observing the number of clusters (step S116). If the result of the determination is that the number of clusters is large ("NO" at step S116), then it is judged that the image is not a clip-art image; otherwise ("YES" at step S116), control proceeds to step S121 and a transition is made to discrimination of clip-art images.

From the results of clustering processing described above, the cluster variance value calculation unit 121 in the clip-art discrimination unit 123 calculates a sample variance value in each cluster that has been obtained by segmentation (step S121). Whether the image is a clip-art image is determined by observing the variance value of each cluster (step S122). If the variance values of the clusters are all low ("YES" at step S122), then it is judged that the image is a clip-art image and control proceeds to step S117; otherwise ("NO" at step S122), it is judged that the image is not a clip-art image.

The image that has been determined to be a clip-art image is subjected to area segmentation processing in the area segmentation unit 116 at step S117. The vector conversion unit 117 executes vectorization processing to convert the results of area segmentation to vector data (step S118).

Thus, in the fifth embodiment of the present invention, as described above, discrimination of clip-art images can be performed accurately even in the case of an image, such as a clip-art image, having a small number of colors but a high variance value for each cluster or an image having a large number of colors but a low variance value for each cluster.

Sixth Embodiment

[Structure]

Figure 19:
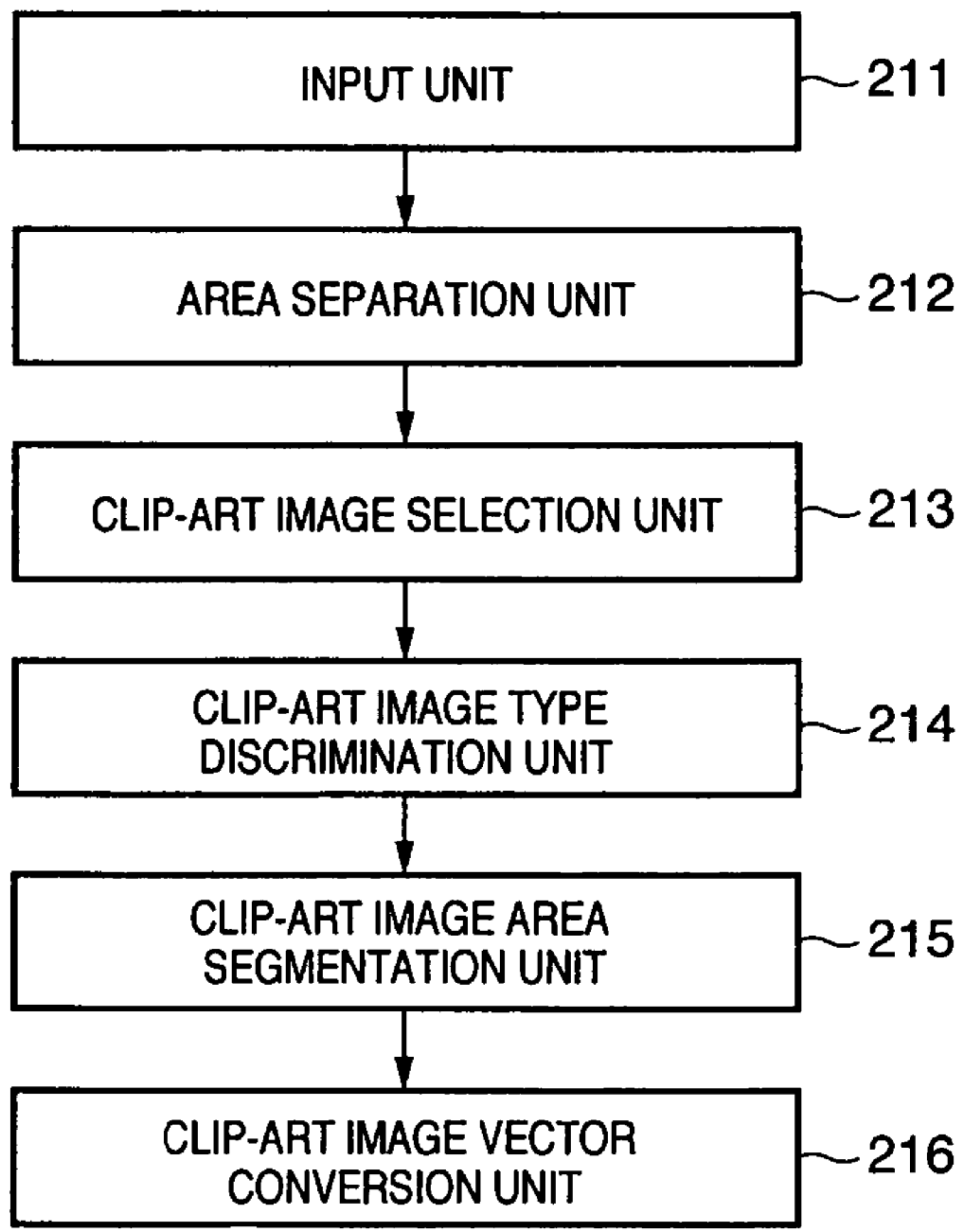
FIG. 19 is a block diagram illustrating the structure of an image processing apparatus having a function for executing vectorization processing based upon area segmentation in a sixth embodiment of the present invention.

FIG. 19 is a block diagram illustrating the structure of an image processing apparatus having a function for executing vectorization processing based upon area segmentation in a sixth embodiment of the present invention. In FIG. 19, an input unit 211 inputs document information as a color document image by a scanner. An area separation unit 212 separates the color document image into areas of a plurality of types that include a photographic area. A clip-art image selection unit 213 selects a clip-art image from the areas separated from the input image. A clip-art image type discrimination unit 214 discriminates the type of clip-art image. A clip-art image area segmentation unit 215 applies segmentation processing to a clip-art image area in accordance with the type of image discriminated. A clip-art image vector conversion unit 216 converts a clip-art image to vector data based upon the results of area segmentation performed by the clip-art image area segmentation unit 215.

As the main components of the digital MFP embodying the image processing apparatus of FIG. 19 are similar to those described with reference to FIG. 10, these need not be described again.

[Overview of Vectorization Processing Based Upon Area Segmentation]

Figure 20:
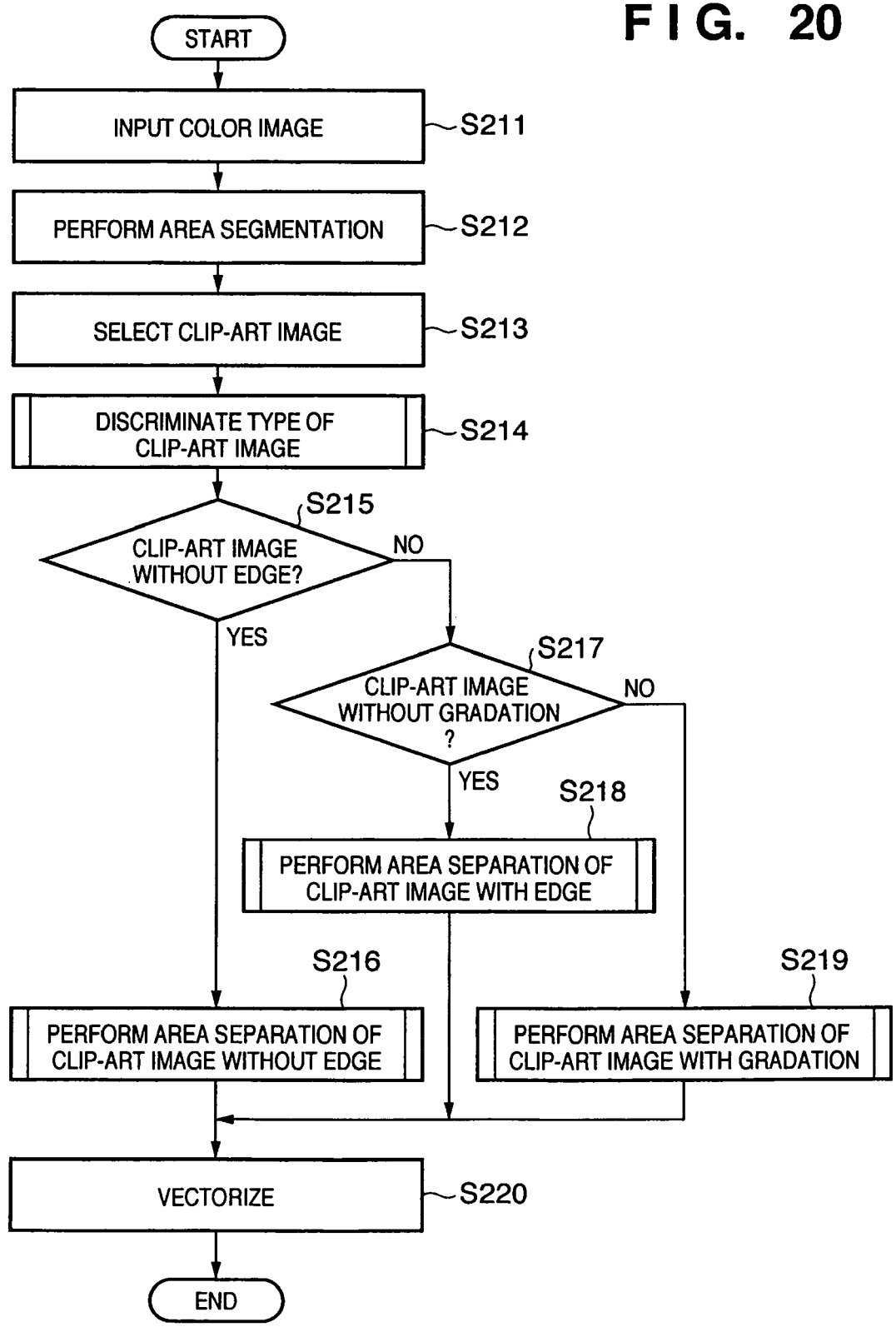
FIG. 20 is a flowchart useful in describing an overview of vectorization processing that is based upon area segmentation of a clip-art image in the sixth embodiment.

FIG. 20 is a flowchart useful in describing an overview of vectorization processing that is based upon area segmentation of a clip-art image in the sixth embodiment.

First, the input unit 211 inputs document information from a scanner and obtained color document image data (step S211). Next, the area separation unit 12 converts the entered color document image to bi-level image data and separates this bi-level image data into areas of a plurality of types such as text, photograph and table areas (step S212). It should be noted that a technique described in the specification of U.S. Pat. No. 5,680,478 entitled "Method and Apparatus for Character Recognition" (Shin-Ywan Wang et al./Canon K. K.) can be used as one example of means for implementing-this area separation processing. Next, the clip-art image selection unit 213 selects clip-art images from the areas obtained by separation in the preceding processing (step S213).

Next, the clip-art image type discrimination unit 214 discriminates the type of clip-art image, e.g., whether it has an edge or whether it has gradation (step S214). The details of processing for discriminating the type of clip-art image will be described later.

Next, based upon the result of discrimination of type of clip-art image, the clip-art image area segmentation unit 215 determines the type of area segmentation with regard to the image discriminated to have or not have an edge (step S215). In a case where the image has been discriminated to be a clip-art image without an edge ("YES" at step S215), area segmentation is applied to the clip-art image that does not have an edge (step S216).

On the other hand, in a case where the image has been discriminated to be a clip-art image with an edge ("NO" at step S215), whether this clip-art image is an image that does not have gradation is discriminated (step S217). In a case where the image has been discriminated to be a clip-art image without gradation ("YES" at step S217), then a clip-art image having an edge is subjected to area segmentation. The details of area segmentation processing of a clip-art image without an edge (step S216), area segmentation processing of a clip-art image with an edge (step S218) and area segmentation processing of a clip-art image having gradation (step S219) will be described later.

After area segmentation processing of steps S216, S218 and S219, the vectorization unit 216 effects a conversion to vector data, based upon contour and color within the area, for every area that has been obtained by segmentation (step S220). An example of a technique for implementing this vectorization processing is to trace the contour of the bi-level image and select the coordinate vector thereof, thereby achieving vectorization, as set forth in the specification of U.S. Pat. No. 2,885,999. It will be assumed that this technique is utilized in the vectorization processing of this embodiment.

[Example of Selection of Clip-art Image]

An example in which a clip-art image has been selected from a document image in the image processing of this embodiment is similar to that of FIG. 3 and need not be described again.

[Processing for Discriminating Image Type]

Figure 21:
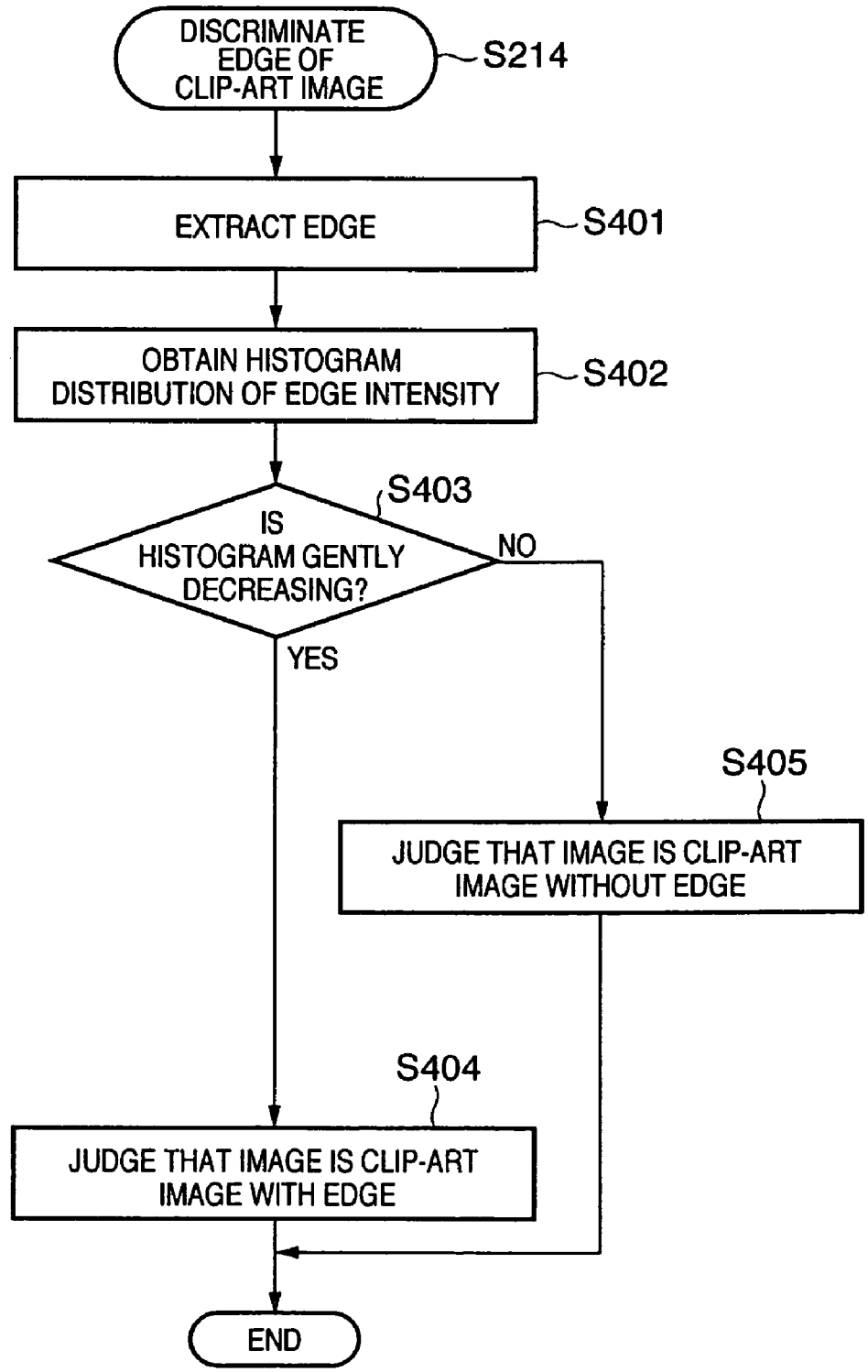
FIG. 21 is a flowchart useful in describing the details of processing for discriminating whether an image has an edge.

FIG. 21 is a flowchart useful in describing the details of processing at step S214 in FIG. 20 for discriminating whether an image has an edge.

First, an edge is extracted from the clip-art image (step S401) and a histogram distribution of edge intensity is obtained (step S402). In this embodiment, it is so arranged that when threshold values of edge intensity are 0, 40, 80, 120 and 160, the numbers of pixels having edge intensities equal to or greater than respective ones of these threshold values are counted as representative values. It is determined whether the distribution of the histogram is gently decreasing or not (step S403). If the result of the determination is that the number of pixels having an edge intensity equal to or greater than the threshold values gently decreases as the threshold value of edge intensity is raised ("YES" at step S403), then it is judged that the image has an edge (step S404). On the other hand, if the number of pixels decreases sharply ("NO" at step S403), it is judged that the image does not have an edge (step S405).

Figure 22:
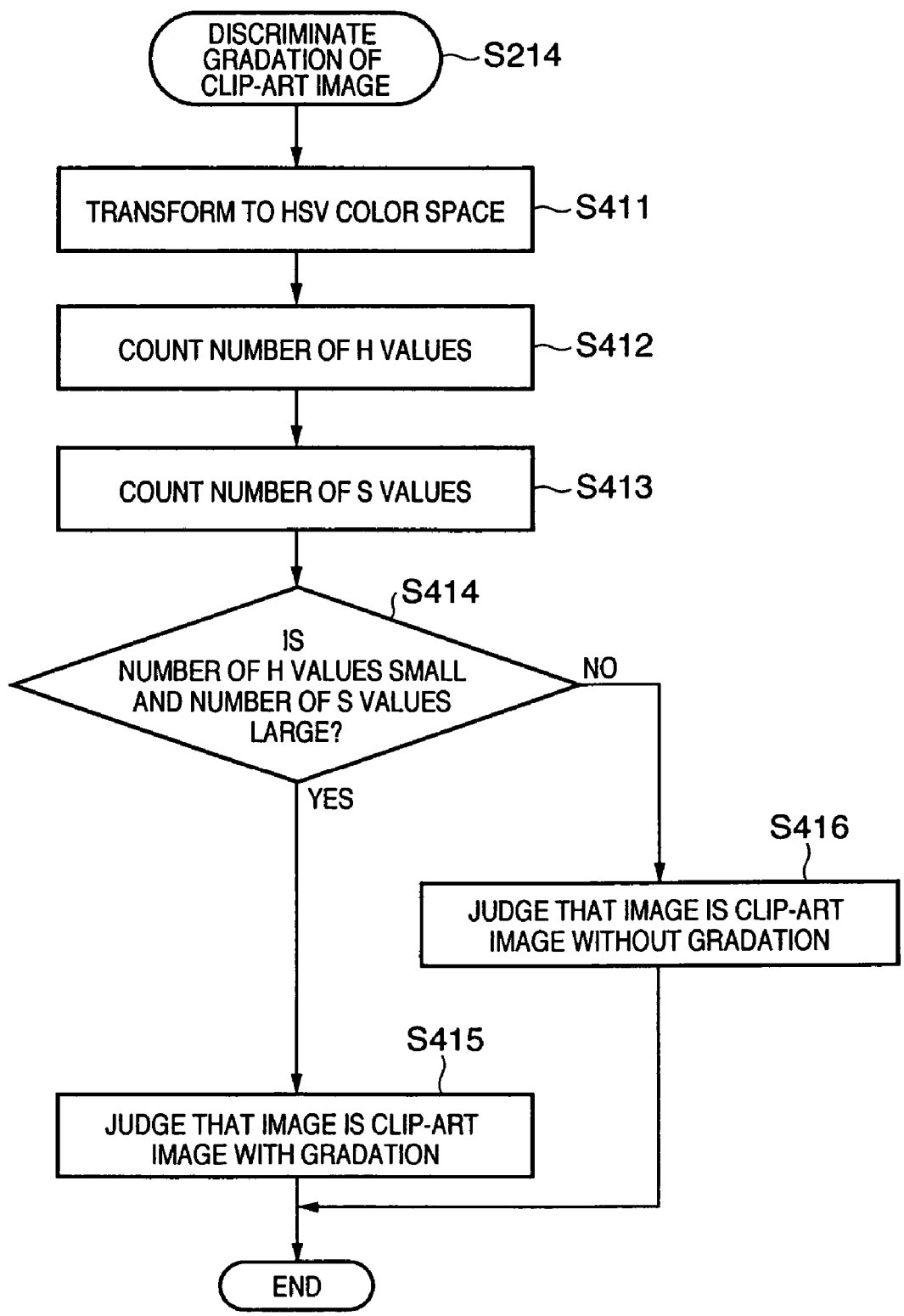
FIG. 22 is a flowchart useful in describing the details of processing for discriminating whether an image has gradation.

FIG. 22 is a flowchart useful in describing the details of processing at step S214 in FIG. 20 for discriminating whether an image has gradation.

First, a color transformation is made from RGB color space to HSV color space (step S411), the number of H values is counted (step S412) and then the number of S values (step S413). It is then determined whether the number of H values is small and the number of S values large (step S414). If the result of the determination is that the number of H values is small and the number of S values large ("YES" at step S414), then it is determined that the image has gradation (step S415). In other cases ("NO" at step S414), then it is determined that the image does not have gradation (step S416).

[Processing for Area Segmentation of Clip-art Image without Edge]

Figure 23:
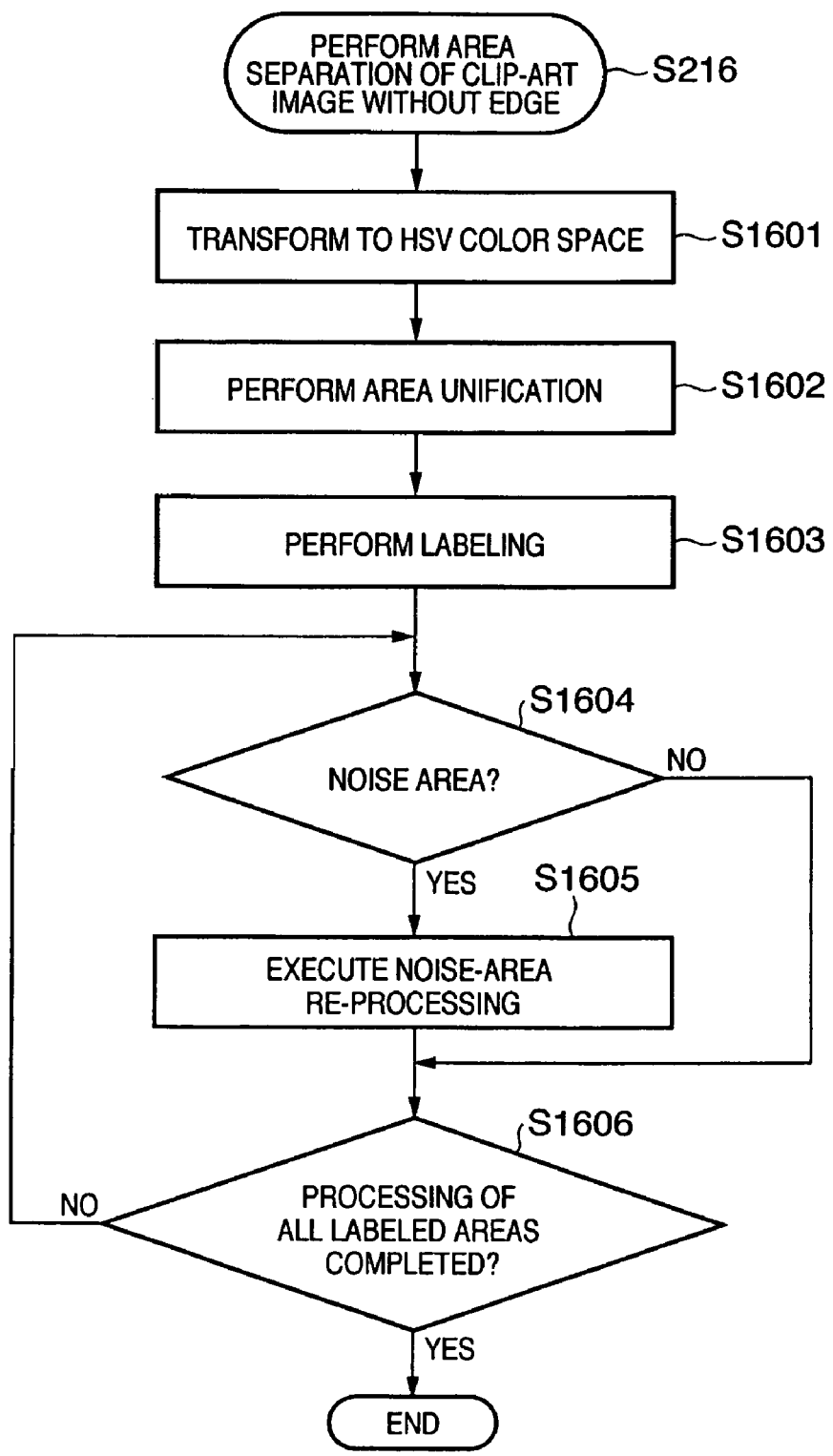
FIG. 23 is a flowchart useful in describing the details of area segmentation of a clip-art image that does not have an edge.

FIG. 23 is a flowchart useful in describing the details of area segmentation of a clip-art image that does not have an edge at step S216 in FIG. 20.

First, clustering processing is executed based upon the color feature of pixels and the image is divided into clusters (step S1601). More specifically, an initial cluster is generated by a starting pixel obtained by raster scanning (step S1601). This is followed by obtaining degrees of similarity between the next pixel and all clusters. The higher the degree of similarity, the shorter the distance between the pixel and cluster, i.e., the closer the features. Although RGB values are used in calculating the degree of similarity, color-space information or information other than color can be used as a feature. The highest degree of similarity and a cluster number corresponding to this degree of similarity are recorded and this degree of similarity is compared with a threshold value set in advance. If the result of the comparison is that the degree of similarity is equal to or greater than the threshold value, then the pixel of interest is made to belong to the cluster recorded. On the other hand, if the degree of similarity is less than the threshold value, then a new cluster is generated with regard to the pixel of interest. If the above-described processing is finished being applied to all pixels, then area segmentation processing is exited.

The clusters obtained by segmentation at step S1601 are unified based upon degree of similarity at step S1602. More specifically, first a target value on number of areas desired to be obtained by separation is input. This target value is a guideline regarding into how many colors an image should be separated. The present number of clusters is then counted and is compared with the target value of number of areas. Cluster unification is performed if the result of the comparison is that the present number of clusters is greater than the target value. Unification processing includes calculating degrees of similarity between clusters, adopting two clusters having the highest degree of similarity from these as clusters, and unifying these two clusters into a single cluster. This cluster unification processing is executed until the number of clusters falls below the target value.

The results of area unification are labeled at step S1603 in order to discriminate a noise area. Whether an area is a noise area is determined at step S1604 depending upon the size of each labeled area (small area). If the result of the determination is that the labeled area is small to a certain extent ("YES" at step S1604), it is judged that the area is a noise area and control proceeds to step S1605. Here, based upon degrees of similarity with adjoining clusters, clustering processing for re-assigning (combining) noise pixels, which are contained in the noise area discriminated at step S1604, to the area of highest degree of similarity is executed and control proceeds to step S1606. On the other hand, if it is determined that the area is not a noise area ("NO" at step S1604), then control proceeds to step S1606.

It is determined at step S1606 whether processing has finished being applied to all labeled areas. If there is a labeled area to undergo processing ("NO" at step S1606), control returns to step S1604 and processing for discriminating a noise area and re-processing of noise area is executed repeatedly. On the other hand, if there is no labeled area to undergo processing ("YES" at step S1606), then noise processing is exited.

[Example of Noise]

FIG. 24 is a diagram illustrating an example of noise dealt with by image processing according to this embodiment. Clusters 61 and 62 in FIG. 24 are examples of two clusters selected as representatives from clusters present after the execution of area segmentation processing (step S1601) and are unification processing (step S1602). Noise in these clusters shown in FIG. 24 is dealt with by the noise discrimination processing and noise re-processing.

[Example of Vectorization Based Upon Area Segmentation of Clip-art Image not having an Edge]

An example of vectorization by the series of processing operations that include area segmentation, area unification, noise-area discrimination and noise-area removal re-processing applied to a clip-art image without an edge in this embodiment is similar to that shown in FIG. 8 and need not be described again.

[Processing for Area Segmentation of Clip-art Image having an Edge]

Figure 25:
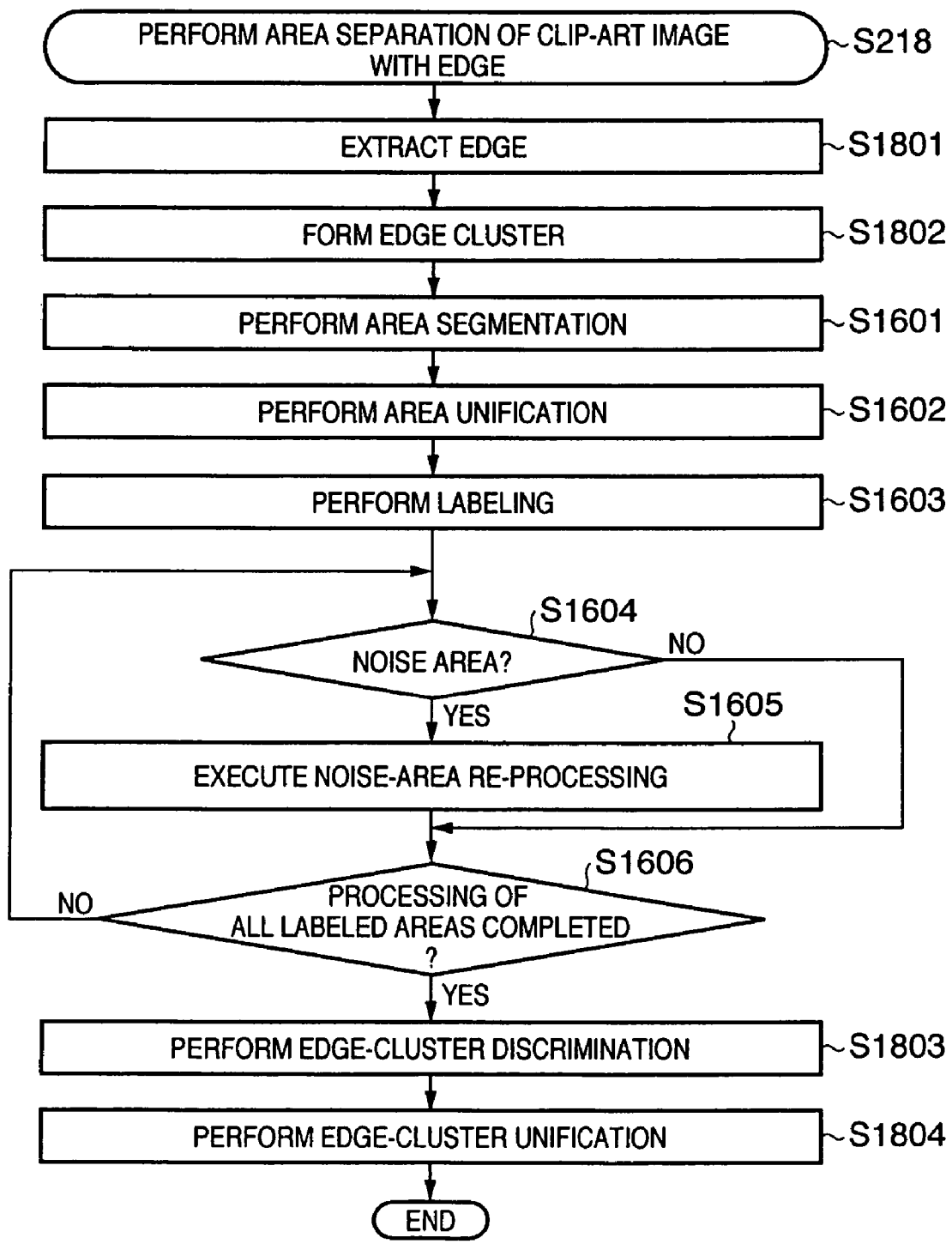
FIG. 25 is a flowchart useful in describing the details of area segmentation of a clip-art image having an edge at step S218 in FIG. 20.

FIG. 25 is a flowchart useful in describing the details of area segmentation of a clip-art image having an edge at step S218 in FIG. 20.

First, an edge is extracted from the clip-art image with the edge (step S1801) and an edge cluster is formed by pixels for which the edge intensity is equal to or greater than a set threshold value (step S1802).

Pixels other than those of an edge cluster are subjected to processing in the same way that processing is applied to a clip-art image not having an edge. That is, the series of processing operations including area segmentation processing (S1601), area unification processing (S1602), labeling processing (S1603), noise-area discrimination processing (S1604) and noise-area re-processing (S1605).

At step S1803, edge-cluster discrimination processing, which is for determining whether a cluster that contains edge information exists other than the initially formed edge cluster, is executed. According to this processing, for every cluster among clusters other than the initial cluster, edge rate is calculated, i.e., the ratio between the number of pixels for which edge intensity is not zero and the number of cluster pixels is calculated. If the result is that the edge rate is high to some extent, then this cluster is determined to be an edge cluster. This cluster and the initially formed cluster are unified at step S1804.

[Example of Edge Cluster]

FIG. 26 is a diagram illustrating an example in which an initially formed edge cluster and a cluster that has been discriminated to be an edge cluster in clusters obtained by segmentation are unified in accordance with the sixth embodiment. In FIG. 26, reference numerals 1711 and 1712 denote an edge cluster initially formed by edge-cluster formation processing and a cluster discriminated to be an edge cluster by edge-cluster discrimination processing, respectively. An edge cluster 1713 is the result of combining the edge clusters 1711 and 1712. Thus, in this embodiment, an image having an edge is dealt with by edge-cluster formation processing, edge-cluster discrimination processing and edge-cluster unification processing.

[Example of Vectorization Based Upon Area Segmentation of Clip-art Image having an Edge]

Figure 27:
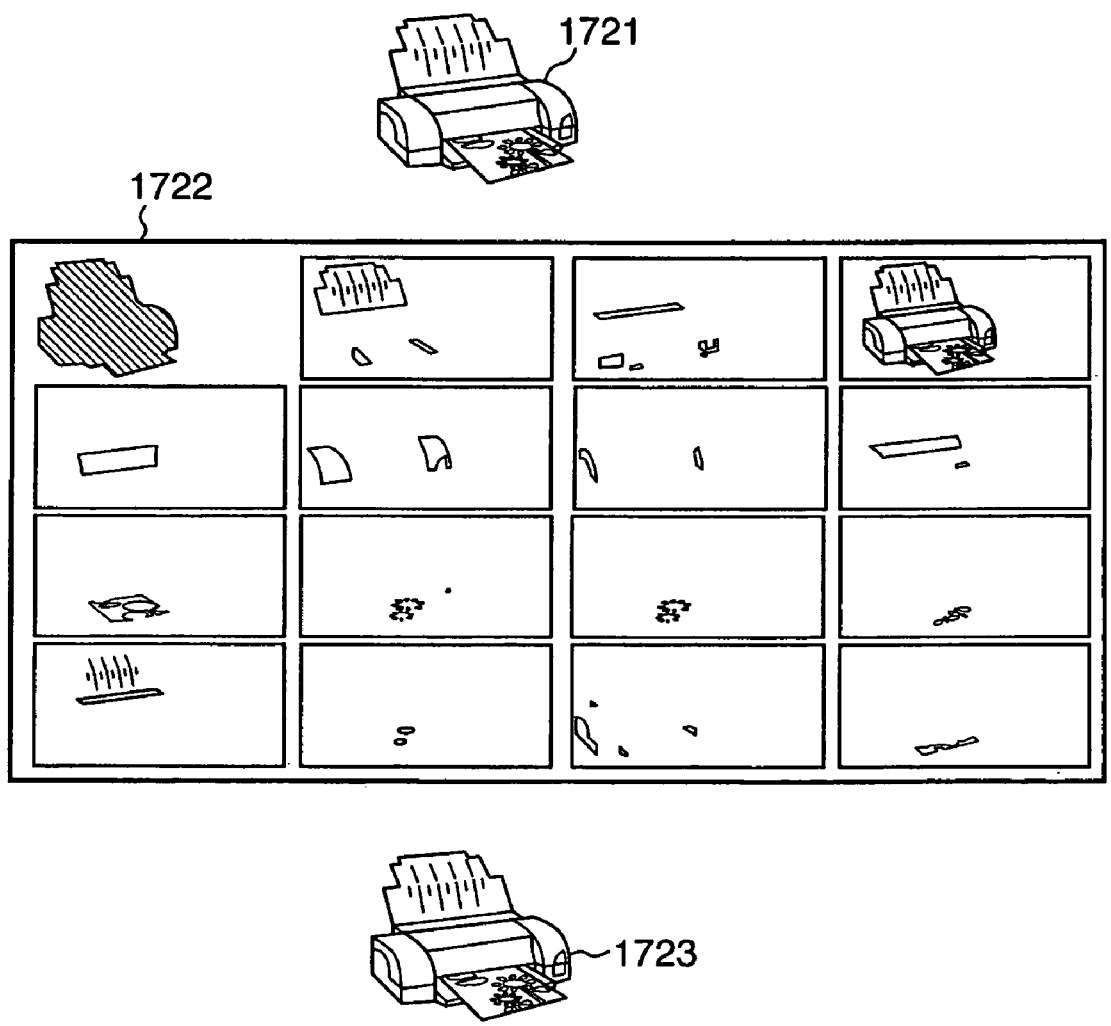
FIG. 27 is a diagram illustrating an example of vectorization based upon a series of processing operations that are applied to a clip-art image having an edge and that include edge extraction, edge-cluster generation, area segmentation, area unification, noise-area discrimination, noise-area re-processing, edge-cluster discrimination and edge-cluster unification.

FIG. 27 is a diagram illustrating an example of vectorization based upon a series of processing operations that are applied to a clip-art image having an edge and that include edge extraction, edge-cluster generation, area segmentation, area unification, noise-area discrimination, noise-area re-processing, edge-cluster discrimination and edge-cluster unification.

In FIG. 27, a clip-art image 1721 having an edge is segmented into clusters, which are shown in results 1722 of area segmentation, in a case where 16 has been specified as a target value of number of areas desired to be obtained by segmentation. A vector image 1723 is the result of converting the results 1722 of area segmentation to vector data. The file size of the vector image 1723 is 45 KB and the file size of the original clip-art image 1721 is 2739 KB. As a result of vectorization, therefore, file size is reduced to less than 1/50 of the original. Edge information, therefore, can be held to a single cluster.

[Processing for Area Segmentation of Clip-art Image having Gradation]

Figure 28:
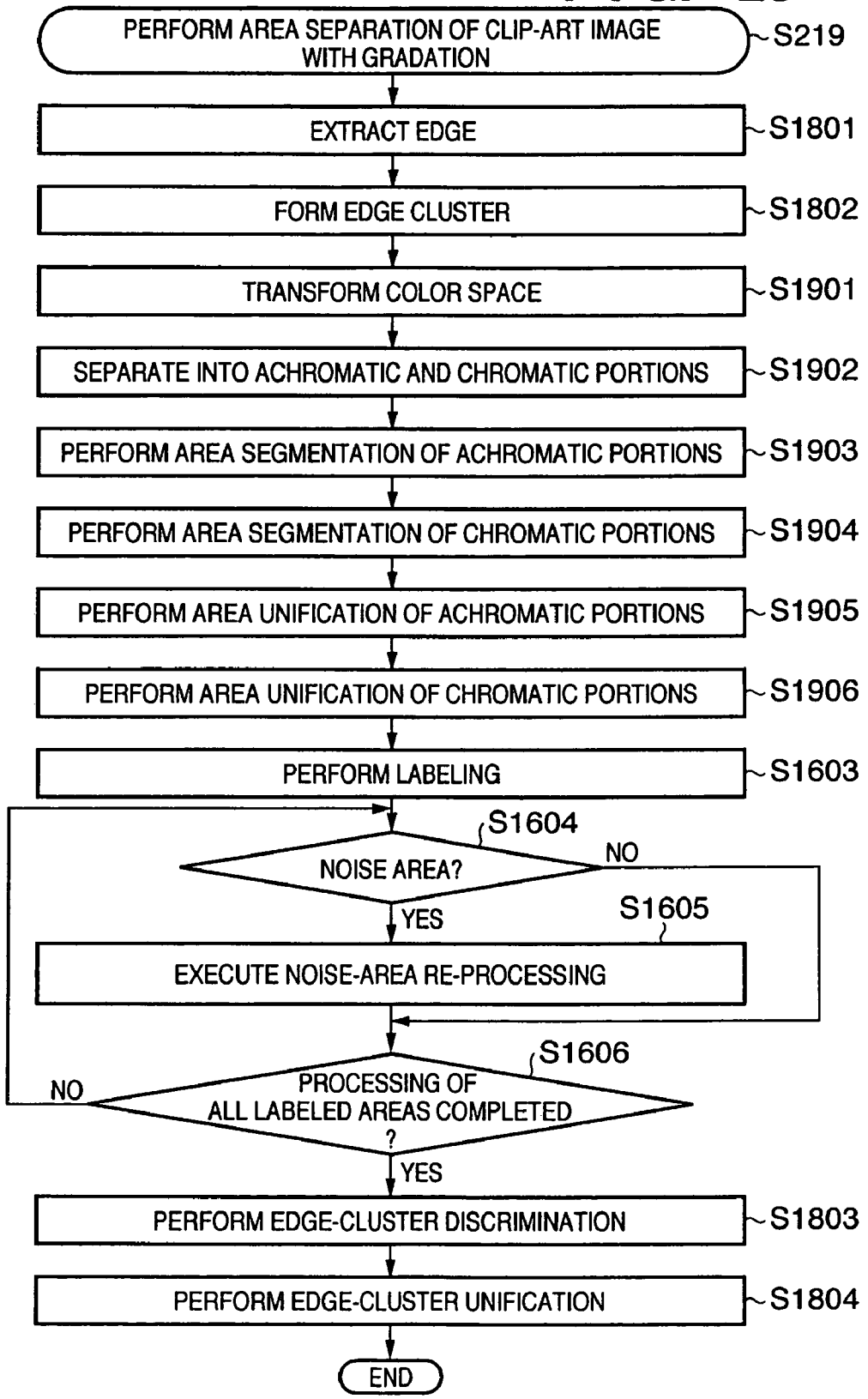
FIG. 28 is a flowchart useful in describing the details of area segmentation of a clip-art image having gradation.

FIG. 28 is a flowchart useful in describing the details of area segmentation of a clip-art image having gradation at step S219 in FIG. 20.

First, an edge is extracted from the clip-art image with the edge (step S1801) and an edge cluster is formed by pixels for which the edge intensity is equal to or greater than a set threshold value (step S1802).

Next, a transformation is made from RGB color space to HSV color space (step S1901) and the image is divided into achromatic and chromatic portions depending upon saturation S (step S1902). The processing for implementing separation into achromatic and chromatic portions causes pixels for which the value of saturation S is zero to belong to achromatic portions and pixels for which the value of saturation S is non-zero to belong to chromatic portions.

Area segmentation of achromatic portions is performed (step S1903). Although this processing is the same as the area segmentation processing of step S1601, the luminance values of pixels are used as the feature and the difference between luminance values is used as the distance between a pixel and a cluster.

Next, area segmentation of chromatic portions is performed (step S1904). This processing uses the RGB color information of pixels as the feature and uses the Euclidean distance of RGB as the difference between a pixel and a cluster.

Next, area unification of achromatic portions is performed (step S1905). Although this processing is the same as the area unification processing of step S1602, the luminance values of pixels are used as the feature and the difference between luminance values is used as the distance between a pixel and a cluster. That the distance between clusters be less than a certain threshold value is the requirement for unification.

Next, area unification of chromatic portions is performed (step S1906). This processing uses RGB color space and hue (H) information of pixels as the feature and uses the difference between RGB Euclidean distance and H as the distance between a pixel and a cluster. That the RGB distance between clusters be less than an RGB threshold value and that the H distance be less than the threshold value of H are the requirements for unification.

Pixels other than those of an edge cluster are subjected to processing in the same way that processing is applied to a clip-art image having an edge. That is, the series of processing operations including labeling processing (S1603), noise-area discrimination processing (S1604), noise-area re-processing (S1605), edge-cluster discrimination processing (S1803) and edge-cluster unification processing (S1804). Results of area segmentation are obtained through this processing.

[Example of Vectorization Based Upon Area Segmentation of Image having Gradation]

Figure 29:
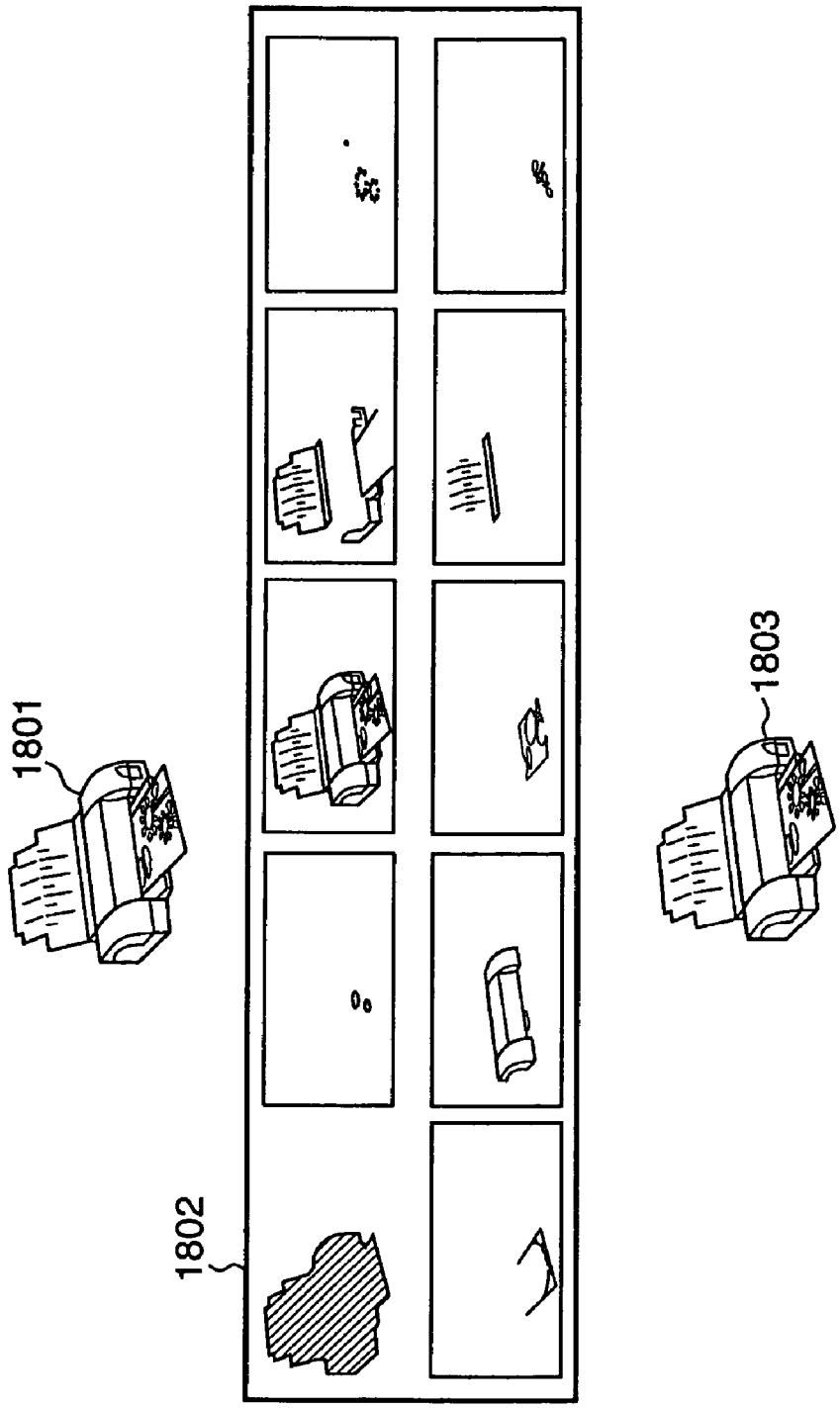
FIG. 29 is a diagram illustrating an example of vectorization performed by applying various processing to a clip-art image having gradation.

FIG. 29 is a diagram illustrating an example of vectorization performed by applying various processing to a clip-art image having gradation. This series of processing operations includes edge extraction, edge-cluster generation, separate area segmentation of each of achromatic and chromatic portions, separate area unification of each of achromatic and chromatic portions, noise-area discrimination, noise-area re-processing, edge-cluster discrimination and edge-cluster unification.

In FIG. 29, a clip-art image 1801 having gradation is segmented into clusters, which are shown in results 1802 of area segmentation, in a case where ten has been specified as a target value of number of areas desired to be obtained by segmentation. The file size of the vector image 1803 is 56 KB and the file size of the original clip-art image 1801 is 2739 KB. As a result of vectorization, therefore, file size is reduced to less than 1/50 of the original. Gradation portions thus can be segmented into areas accurately.

In accordance with this embodiment, as described above, the type of image to undergo processing, namely whether the image has an edge and whether it has gradation can be discriminated automatically and processing conforming to each type of image is executed to make possible efficient vectorization.

Other Embodiments

Although embodiments of the present invention have been described in detail, the invention can be worked as a system, apparatus, method, program or storage (recording) medium, by way of example. More specifically, the present invention may be applied to a system constituted by a plurality of devices or to an apparatus comprising a single device.

Furthermore, there are cases where the object of the invention is attained also by supplying software programs (programs corresponding to the flowcharts illustrated in the drawings of the embodiment), which implement the functions of the foregoing embodiments, directly or remotely to a system or apparatus, reading the supplied program codes with a computer of the system or apparatus, and then executing the program codes.

Accordingly, since the functions of the present invention are implemented by computer, the program codes per se installed in the computer also implement the present invention. In other words, the present invention also covers a computer program per se that is for the purpose of implementing the functions of the present invention.

In this case, so long as the system or apparatus has the functions of the program, the form of the program, e.g., object code, a program executed by an interpreter or script data supplied to an operating system, etc., does not matter.

Examples of recording media that can be used for supplying the program are a floppy (registered trademark) disk, hard disk, optical disk, magneto-optical disk, CD-ROM, CD-R, CD-RW, magnetic tape, non-volatile type memory card, ROM, DVD (DVD-ROM, DVD-R), etc.

As for the method of supplying the program, the client computer can be connected to a website on the Internet using a browser possessed by the client computer, and the computer program per se of the present invention or an automatically installable compressed file of the program can be downloaded to a recording medium such as a hard disk. Further, the program of the present invention can be supplied by dividing the program code constituting the program into a plurality of files and downloading the files from different websites. In other words, a WWW (World Wide Web) server that downloads, to multiple users, the program files that implement the functions of the present invention by computer also is covered by the claims of the present invention.

Further, it is also possible to encrypt and store the program of the present invention on a storage medium such as a CD-ROM, distribute the storage medium to users, allow users who meet certain requirements to download decryption key information from a website via the Internet, and allow these users to run the encrypted program by using the key information, whereby the program is installed in the user computer.

Furthermore, besides the case where the aforesaid functions according to the embodiments are implemented by executing the read program by computer, an operating system or the like running on the computer may perform all or a part of the actual processing so that the functions of the foregoing embodiments can be implemented by this processing.

Furthermore, after the program read from the recording medium is written to a memory provided on a function expansion board inserted into the computer or provided in a function expansion unit connected to the computer, a CPU or the like mounted on the function expansion board or function expansion unit performs all or a part of the actual processing so that the functions of the foregoing embodiments can be implemented by this processing.

As many apparently widely different embodiments of the present invention can be made without departing from the spirit and scope thereof, it is to be understood that the invention is not limited to the specific embodiments thereof except as defined in the appended claims.

This application claims the benefit of Japanese Patent Application No. 2005-170043 filed on Jun. 9, 2005, Japanese Patent Application No. 2005-351312 filed on Dec. 5, 2005, and Japanese Patent Application No. 2006-095841 filed on Mar. 30, 2006, which are hereby incorporated by reference herein in their entirety.

What is claimed is:

1. An image processing method in an image processing apparatus for vectorizing a document image which contains a clip-art image, the method comprising:
 a selection step of segmenting the document image into areas and selecting the clip-art image area;
 a discrimination step of discriminating the type of clip-art image area;
 an area segmentation step of further segmenting the clip-art image area into areas in accordance with the type of clip-art image discriminated; and
 a conversion step of converting the clip-art image obtained in said area segmentation step into vector data.

2. The method according to claim 1, wherein said discrimination step includes:
 an edge discrimination step of discriminating whether the clip-art image has an edge; and
 a gradation discrimination step of discriminating whether the clip-art image has gradation.

3. The method according to claim 2, wherein said edge discrimination step includes:
 an edge extraction step of extracting an edge from the clip-art image; and
 a determination step of obtaining a histogram distribution that is based upon intensity of the edge detected, and determining whether the clip-art image has an edge based upon the histogram.

4. The method according to claim 3, wherein said determination step includes determining that the clip-art image is a clip-art image with an edge in a case where a number of pixels having an edge intensity equal to or greater than a threshold value of edge intensity gently decreases as the threshold value is raised in a histogram distribution, and determining that the clip-art image is a clip-art image without an edge in a case where a number of pixels having an edge intensity equal to or greater than a threshold value of edge intensity gently does not gently decrease as the threshold value is raised in the histogram distribution.

5. The method according to claim 4, wherein in a case where it has been determined at said determination step that the clip-art image is a clip-art image without an edge, said area segmentation step includes the steps of:
 segmenting the clip-art image into a plurality of clusters based upon color features of pixels;
 discriminating whether a small area included in the plurality of clusters is a noise area; and
 eliminating a small area discriminated as being a noise area by combining the small area to a cluster having a high degree of similarity.

6. The method according to claim 4, wherein in a case where it has been determined at said determination step that the clip-art image is a clip-art image with an edge, said area segmentation step includes the steps of:
 extracting an edge from the clip-art image;
 forming an edge cluster based upon intensity of the edge extracted;
 segmenting the clip-art image into a plurality of clusters based upon color features of pixels other than those of the edge cluster within the clip-art image;
 discriminating whether a small area included in the plurality of clusters is a noise;
 eliminating a small area discriminated as being a noise area by combining the small area to a cluster having a high degree of similarity;

determining whether the cluster after the elimination is an edge cluster; and unifying a cluster, which has been determined to be an edge cluster, with the edge cluster that has been formed based upon the intensity of the edge.

7. The method according to claim 2, wherein said gradation discrimination step includes:

a color transformation step of transforming the clip-art image from RGB color space to HSV color space; and a determination step of determining whether the clip-art image has gradation based upon information hue (H) and saturation (S) information in the HSV color space.

8. The method according to claim 7, wherein said determination step includes determining that the clip-art image is a clip-art image with gradation in a case where the image appears in a range in which hue (H) is small and saturation (S) is large in HSV color space, and determining that the clip-art image is a clip-art image without gradation in a case where the image does not appear in a range in which hue (H) is small and saturation (S) is large in HSV color space.

9. The method according to claim 8, wherein in a case where it has been determined at said determination step that the clip-art image is a clip-art image with gradation, said area segmentation step includes the steps of:

extracting an edge from the clip-art image;

forming an edge cluster based upon intensity of the edge extracted;

transforming the clip-art image from RGB color space to HSV color space;

separating the clip-art image into achromatic and chromatic portions upon referring to saturation (S);

segmenting the achromatic and chromatic portions into areas;

unifying each of the areas, which have been obtained by segmentation, using pixel information;

labeling the clip-art image as a plurality of clusters based upon color features of pixels other than those of the edge cluster within the clip-art image;

discriminating a noise area included in the plurality of clusters;

unifying the noise area to a cluster having a high degree of similarity;

determining whether the cluster after assignment is an edge cluster; and unifying a cluster, which has been determined to be an edge cluster, with the edge cluster that has been formed based upon the intensity of the edge.

10. A program for causing a computer to execute the image processing method set forth in claim 1.

11. An image processing apparatus for vectorizing a document image which contains a clip-art image, the apparatus comprising:

selection means for segmenting the document image into areas and selecting the clip-art image area;

discrimination means for discriminating the type of clip-art image area;

area segmentation means for further segmenting the clip-art image area into areas in accordance with the type of clip-art image discriminated; and conversion means for converting the clip-art image obtained by said area segmentation means into vector data.

12. An image processing apparatus for converting an image into vector data, comprising:

input means for inputting an image;

first area segmentation means for segmenting the image into areas;

extraction means for extracting an illustration area from the areas obtained by segmentation;

determination means for determining whether the illustration area extracted is a clip-art image;

second area segmentation means for further segmenting into areas an area that has been determined to be a clip-art image; and conversion means for converting the clip-art image obtained by area segmentation to vector data.

13. The apparatus according to claim 12, wherein said determination means includes:

clustering means for executing clustering processing of pixels within the illustration area;

cluster counting means for counting number of clusters from results of clustering processing; and clip-art determination means for determining that the illustration area is a clip-art image if the number of clusters is less than a threshold value.

14. The apparatus according to claim 13, wherein said clustering means executes clustering processing, in which degrees of similarity between clusters has been set lower than a threshold value, using color features of each of the pixels within the illustration area.

15. The apparatus according to claim 12, wherein said determination means includes:

clustering means for executing clustering processing of pixels within the illustration area;

cluster variance calculation means for calculating a variance value in each cluster from results of clustering processing; and clip-art determination means for determining that the illustration area is a clip-art image if variance values in each of the clusters are all less than a threshold value.

16. The apparatus according to claim 12, wherein said determination means includes:

clustering means for executing clustering processing of pixels within the illustration area;

cluster counting means for counting number of clusters from results of clustering processing; and cluster-count determination means for determining whether the number of clusters is less than a threshold value;

cluster variance calculation means for calculating a variance value in each cluster if variance values in each of the clusters are all less than the threshold value.

17. The apparatus according to claim 12, wherein said second area segmentation means includes:

means for applying clustering processing to the area that has been determined to be a clip-art image;

means for counting the number of clusters from the results of clustering processing;

means for inputting a target cluster number;

means for executing unification processing between clusters until the number of clusters reaches the target cluster number;

means for determining, with regard to each cluster prevailing after unification processing has ended, that a cluster for which the number of pixels within the cluster is less than a threshold value is a noise area; and means for combining each pixel, which is within a cluster that has been determined to be a noise area, to a cluster situated in the neighborhood.

18. The apparatus according to claim 17, wherein said means for applying clustering processing executes clustering processing, in which degrees of similarity between clusters has been set higher than a threshold value, using color features of each of the pixels within the area.

19. An image processing method for converting an image into vector data, comprising:
- a first area segmentation step of segmenting the image into areas;
- an extraction step of extracting an illustration area from the areas obtained by segmentation;
- a determination step of determining whether the illustration area extracted is a clip-art image;
- a second area segmentation step of further segmenting into areas an area that has been determined to be a clip-art image; and
- a conversion step of converting the clip-art image obtained by area segmentation to vector data.

20. A program stored on a computer-readable medium for causing a computer to converting an image into vector data, comprising:
- a first area segmentation step of segmenting the image into areas;
- an extraction step of extracting an illustration area from the areas obtained by segmentation;
- a determination step of determining whether the illustration area extracted is a clip-art image;
- a second area segmentation step of further segmenting into areas an area that has been determined to be a clip-art image; and
- a conversion step of converting the clip-art image obtained by area segmentation to vector data.

\* \* \* \* \*